United States Patent
Arad et al.

(10) Patent No.: US 10,521,612 B2
(45) Date of Patent: Dec. 31, 2019

(54) HYBRID ON-PREMISES/SOFTWARE-AS-SERVICE APPLICATIONS

(71) Applicant: CA, Inc., Islandia, NY (US)

(72) Inventors: Dan Arad, Islandia, NY (US); Alex Haiut, Tel Aviv (IL); Vitali Bykhovsky, Tel Aviv (IL); Dor Atias, Tel Aviv (IL); Guy Arye, Tel Aviv (IL)

(73) Assignee: CA, Inc., Islandia, NY (US)

( * ) Notice: Subject to any disclaimer, the term of this patent is extended or adjusted under 35 U.S.C. 154(b) by 107 days.

(21) Appl. No.: 15/629,226

(22) Filed: Jun. 21, 2017

(65) Prior Publication Data
US 2018/0373885 A1 Dec. 27, 2018

(51) Int. Cl.
| | | |
|---|---|---|
| G06F 21/00 | (2013.01) | |
| G06F 21/62 | (2013.01) | |
| H04L 9/08 | (2006.01) | |
| H04L 12/24 | (2006.01) | |
| G06F 11/34 | (2006.01) | |

(52) U.S. Cl.
CPC .......... G06F 21/629 (2013.01); H04L 9/088 (2013.01); *G06F 11/3447* (2013.01); *H04L 41/0896* (2013.01); *H04L 41/145* (2013.01); *H04L 2209/16* (2013.01)

(58) Field of Classification Search
CPC .............................. H04L 9/088; G06F 21/629
USPC .......................................................... 726/26
See application file for complete search history.

(56) References Cited

U.S. PATENT DOCUMENTS

| | | | | |
|---|---|---|---|---|
| 6,253,193 B1 * | 6/2001 | Ginter | ..................... | G06F 21/10 |
| | | | | 348/E5.006 |
| 6,668,325 B1 * | 12/2003 | Collberg | ................ | G06F 21/14 |
| | | | | 713/194 |
| 2014/0108665 A1 | 4/2014 | Arora et al. | | |
| 2014/0283111 A1 | 9/2014 | Dolph et al. | | |
| 2014/0331337 A1 | 11/2014 | Factor et al. | | |
| 2015/0095703 A1 | 4/2015 | Girmonsky | | |
| 2015/0163124 A1 | 6/2015 | Girmonsky | | |

(Continued)

OTHER PUBLICATIONS

"Hybrid SaaS," Wikipedia, Jun. 2018, Retrieved from the Internet: URL: <https://en.wikipedia.org/wiki/Hybrid_SaaS>, 2 pages.

(Continued)

*Primary Examiner* — Longbit Chai
(74) *Attorney, Agent, or Firm* — Pillsbury Winthrop Shaw Pittman, LLP

(57) ABSTRACT

Provided is a process, including: obtaining, within a trusted computing environment, data comprising confidential values and non-confidential values; replacing, within the trusted computing environment, the confidential values with obfuscated identifiers; sending, from the trusted computing environment, into an untrusted computing environment, an obfuscated representation of the data; transforming, in the untrusted computing environment, the obfuscated representation of the data; sending, from the untrusted computing environment, the obfuscated transformed data into the trusted computing environment; and replacing, within the trusted computing environment, obfuscated identifiers in the obfuscated transformed data with confidential values.

19 Claims, 6 Drawing Sheets

(56) References Cited

U.S. PATENT DOCUMENTS

| | | |
|---|---|---|
| 2015/0310188 A1 | 10/2015 | Ford et al. |
| 2015/0381467 A1 | 12/2015 | Girmonsky et al. |
| 2016/0077869 A1 | 3/2016 | Grueneberg et al. |
| 2016/0241596 A1 | 8/2016 | Overby, Jr. et al. |
| 2016/0261684 A1 | 9/2016 | Khalaf et al. |
| 2016/0283713 A1 | 9/2016 | Brech et al. |
| 2016/0337450 A1 | 11/2016 | Anantharam et al. |
| 2017/0116171 A1 | 4/2017 | Villard, Jr. et al. |
| 2017/0118086 A1 | 4/2017 | McKenna et al. |
| 2017/0163283 A1 | 6/2017 | Bradbury et al. |

OTHER PUBLICATIONS

Tickle, P., "Why SaaS vs. on-premise doesn't have to be an either/or decision," betanews, Apr. 2014, Retrieved fro the Internet: URL: <ttps://betanews.com/2014/04/25/why-saas-vs-on-premise-doesnt-have-to-be-an-eitheror-decision/>, 3 pages.

Clarkson, R., "Security still inhibits SaaS adoption, how hybrid SaaS provides an answer," North Bridge, Aug. 2016, Retrieved from the Internet: URL: <https://web.archive.org/web/20160826055721/http://www.northbridge.com/security-still-inhibits-saas-adoption-how-hybrid-saas-provides-answer>, 2 pages.

\* cited by examiner

HYBRID ON-PREMISES/SOFTWARE-AS-SERVICE APPLICATIONS

BACKGROUND

1. Field

The present disclosure relates generally to distributed computing and, more specifically, to hybrid on-premises/software-as-a-service applications.

2. Description of the Related Art

Performance-testing applications are used to test how well target applications function under load, e.g., measuring responsiveness to user requests or application program interface (API) requests (which is not to imply that a user request cannot be structured as an API request) at load. Often, performance-testing applications are configured to test target applications with relatively large loads relative to the capabilities or expected use cases for the target application. Such load testing often reveals modes of failure or diminished levels of service that can be addressed by developers or operations engineers before end users experience these effects.

Many of these applications used automated scripts to simulate user behavior when interacting with the target application. Examples of use cases include using a performance-testing application to attempt to log-into user accounts of a target application at a rate of more than 1,000 requests per minute, when typical usage patterns are below 500 requests per minute, to reveal problems that might arise in the event of a sudden surge in popularity of the target application or failure of some resources of the target application (e.g., loss of a subset of devices behind a load balancer). Another example includes configuring flights on an airline website according to various criteria and measuring responsiveness during a relatively large number of concurrent sessions, or some use cases might attempt to add items to an online shopping cart and checkout.

Detected problems might include responses that take longer than is permitted under service level agreements or undesirable interactions with other aspects of the target application. Other examples of detected problems might include inconsistent state across distributed records for longer than is expected, slow responses to other types of requests, or unexpectedly high usage of other resources, like bandwidth, storage, processor time, or third-party APIs.

SUMMARY

The following is a non-exhaustive listing of some aspects of the present techniques. These and other aspects are described in the following disclosure.

Some aspects include a process, including: obtaining, with one or more processors, within a trusted computing environment, data comprising confidential values and non-confidential values, wherein the data comprises at least one hybrid association in which a first confidential value is paired with a first non-confidential value; replacing, with one or more processors, within the trusted computing environment, the confidential values with obfuscated identifiers to form an obfuscated representation of the data, wherein a first obfuscated identifier is paired with the first confidential value in the obfuscated representation of the data; sending, with one or more processors, from the trusted computing environment, into an untrusted computing environment, via a network, the obfuscated representation of the data; transforming, with one or more processors, in the untrusted computing environment, the obfuscated representation of the data to produce obfuscated transformed data including the obfuscated identifiers, wherein transforming includes determining results of an analysis based on the first non-confidential value, the results being included in the obfuscated transformed data; sending, with one or more processors, from the untrusted computing environment, via the network, the obfuscated transformed data into the trusted computing environment; and replacing, with one or more processors, within the trusted computing environment, obfuscated identifiers in the obfuscated transformed data with confidential values corresponding to the obfuscated identifiers in the obfuscated transformed data.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
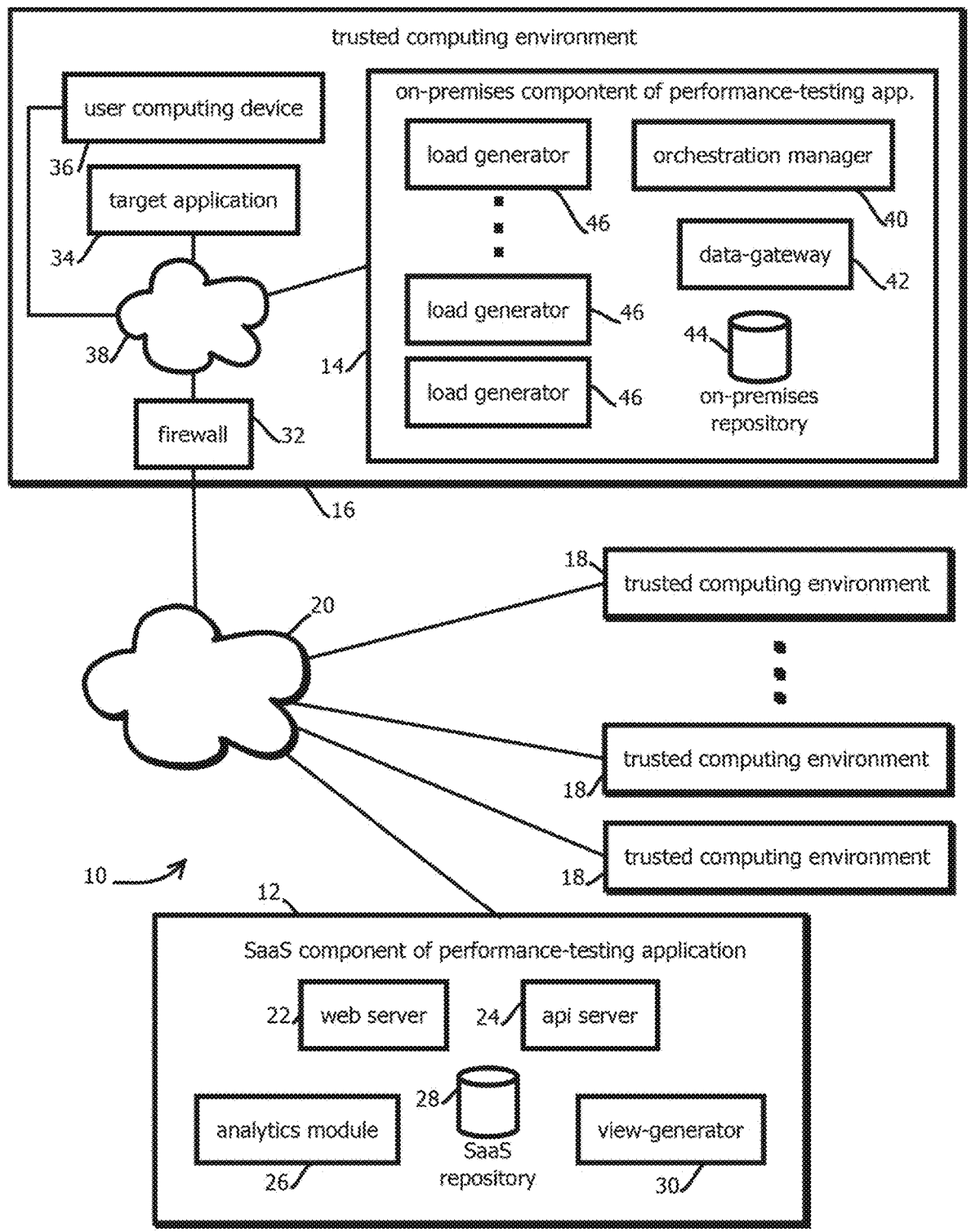
FIG. 1 is a logical and physical architecture block diagram that shows an example of a hybrid on-premises/software-as-a-service performance-testing application in accordance with some embodiments of the present techniques.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the fields of computer science and cybersecurity. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

In some cases, performance-testing applications are provided with a software-as-a-service (SaaS) model, where several entities operating target applications, referred to as tenants, configure tests run from computing devices provided by a third party. Often, desirable aspects of this model include ease of management by the tenants, as there is less software and hardware for them to manage relative to on-premises installs. Further, with a SaaS model, organizations often do not need to pay for computing resources implementing the SaaS application when they the SaaS application is not in use.

But a pure SaaS model can give rise to security concerns. Often, entities operating target applications are sensitive to where data emitted by, or used to access, those applications physically resides. In many cases, tenant entities (e.g., companies and governmental organizations) require that at least some, or all, of their data not leave computing devices under their control (e.g., physically under their control on their premises or those of a trusted third party). In many cases, these requirements arise from government regulations or security policies within companies. Such requirements often make it difficult for these entities to use SaaS performance-testing applications hosted by a provider of the application or on the public cloud.

On way to mitigate this issue is to install performance-testing applications on-premises (e.g., on the property of an entity operating the application, or on the property of a trusted third party, typically without sharing computing devices on that third party's property with other users), with different instances of the performance-testing application running in their entirety in data centers on the premises of entities controlling the respective target application being tested. In many cases, the performance-testing application is installed on a private network (or virtual private cloud) with the hosts implementing the target application, and communication to or from the performance-testing application into or out of the private network is not provided or blocked. As a result, the performance-testing application often can be run with elevated confidence that sensitive information is not being exfiltrated, and malicious content (e.g., worms, virus, trojans, etc.) is not being brought into a trusted portion of the network operating the target application.

This arrangement, however, can make it difficult to manage performance-testing applications, as many of the advantages of a SaaS implementation are impaired or lost in on-premises installations. For instance, updating the performance-testing application can be slow and expensive when each entity operating a target application imposes different and arduous auditing processes on new code entering trusted regions of their networks. This can slow the release of new features and delay security updates in some cases. The issue can be particularly acute when faster-moving, innovative providers of performance-testing applications are providing testing services to companies constrained by regulations and complex security processes, as often happens when companies store health records, credit card numbers, social security numbers, and the like. More innovated providers of performance-testing applications might provide updates every two weeks, while user-entity review processes might take two years in some cases. These different cadences can make it difficult to manage the on-premises versions of performance-testing applications.

Indeed, analogous issues arise in other contexts where a SaaS application interfaces with sensitive applications with sensitive data. Often, entities operating these more sensitive applications are relegated to on-premises installations and the associated the burden and delays arising from on-premises installations (which is not to suggest that on-premises installations are disclaimed, as some techniques described below may have purely on-premises use-cases). Other examples of potentially sensitive applications include hosted email applications, customer-relationship management applications, accounting applications, human-resources data management applications, enterprise-resource management applications, application performance management applications, code repositories, document management applications, messaging applications, log management applications, and the like.

Some embodiments mitigate some of the above-mentioned problems or other problems described below or that will be apparent to one of ordinary skill in the art reading this disclosure with a hybrid on-premises/SaaS distributed application. Some embodiments split data processed by the hybrid application and store confidential portions of data (e.g., exclusively) on-premises while performing analysis of non-confidential portions and versions of that data off-premises, e.g., in the public cloud or in a data center that is not under the tenant's direct control. Off-premises data structures may include associations between or to on-premises (e.g., exclusively on-premises) data with references to the confidential data, where the references uniquely identify the confidential data, but do not reveal the data itself.

Various analyses, user-interfaces, and reports may be generated off-premises by including these references. These outputs may be sent to on-premises user computing devices (or other users or services in a trusted environment of the entity at issue), which may access these analyses, user-interfaces, and reports (which is not to imply that a user interface cannot include a report or analysis, or that any other list implies categories are mutually exclusive) by requesting the off-premises representation, and then replacing the references to confidential data with the confidential data from within the trusted environment. Thus, in some cases, much of the logic of the hybrid distributed application may reside off-premises, where the same logic can be updated relatively easily for various tenant users, while sensitive data of each tenant does not leave the premises of the tenant users.

Some embodiments may further mitigate issues that arise when attempting to provide tech-support to users of hybrid on-premises/SaaS applications. Off-premises tech support users may not be able to view the same user interface as user that are on-premises, making it difficult for the different users to communicate about what they are seeing on in their respective user interfaces. To facilitate troubleshooting and training, some embodiments may provide an on-premises user-interface that, responsive to user inputs, toggles back and for the between views that present the confidential data and corresponding obfuscated references to that data. Thus, an on-premises user may view and discus information appearing on a tech-support technician's screen to describe problems that they are experiencing on-premises.

The techniques are described with reference to a performance-testing application, but it should be emphasized that the approach may be used in other types of distributed applications interfacing with other applications subject to security concerns, like those described above, which is not to suggest that any other description is limiting.

The present techniques are best understood in view of an example shown in FIG. 1, which includes a computing environment 10 having a hybrid on-premises/SaaS performance-testing application split into two components 12 and 14. In some embodiments, the illustrated on-premises component 14 may execute within a trusted computing environment 16, and the illustrated SaaS component 12 may execute outside of the trusted computing environment 16, in some cases servicing a plurality of different trusted computing environments 18 that, relative to one another may themselves be untrusted by other illustrated trusted computing environments 16 and 18.

In some embodiments, the trusted computing environments may be different private networks, such as virtual private clouds or other private network secured behind a firewall. Each trusted computing environment may include a plurality of networked computing devices, in some cases with a private Internet Protocol address space. In some embodiments, confidential data may be held, in some cases exclusively, within the trusted computing environment where the data is obtained, while obfuscated representations of the data may be sent to the SaaS component 12 for storage and processing in obfuscated form, thereby permitting some, and in some cases much, of the logic of the distributed hybrid performance-testing application to reside outside of the trusted computing environments 16 and 18, affording many of the advantages described above associated with SaaS implementations. Four different trusted computing environments 16 and 18 are illustrated as communicating with the SaaS component 12 via the Internet 20 and various other networks. It should be noted, though, that commercial implementations are expected to include substantially more, for example, more than 10, more than 50, more than 500, or more than 5,000 different trusted computing environments interfacing with the SaaS component 12 via the Internet 20 in some embodiments.

In some embodiments, the components of the computing environment 10 illustrated in FIG. 1 may be geographically distributed, for example over an entire continent or the world, in some cases with the SaaS component 12 being disposed more than 100, 1000, or 5000 km from some of the trusted computing environments 16 or 18 and some of the trusted computing environments being this far from one another.

In some embodiments, the SaaS component of the performance-testing application 12 may include a Web server 22, an application program interface (API) server 24, an analytics module 26, a SaaS data repository 28, and a view generator 30. In some embodiments, these components may communicate with one another, for example, via a network within a data center as different services exposed on different hosts to effectuate the operations described herein as attributed to the SaaS component 12. In some embodiments, the SaaS component 12 may be executed within a private data center of an entity providing the performance-testing application to a plurality of different tenants, in some cases with a different tenant associated with each different trusted computing environment 16 or 18. In some embodiments, the Web server 22 and the API server 24 may be consolidated into a single server, which is not to suggest that other features described herein are limiting. In some embodiments, one or both of the servers 22 and 24 may implement a representational-state-transfer-based (REST-based) or non-REST-based interface with a nonblocking server configured to service a relatively large number of concurrent sessions, for example, more than 100 or more than 1,000 concurrent sessions.

In some embodiments, the servers 22 and 24, or business logic modules coupled to the servers 22 and 24, may coordinate the operation of the components of the SaaS component 12 to effectuate the operations described below with reference to FIGS. 2 and 3 as occurring in the untrusted computing environment.

In some embodiments, the analytics module 26 may effectuate the transformations described below on obfuscated data received from the trusted computing environments. In some embodiments, the results of these transformations may be stored in the illustrated SaaS data repository 28, in some cases in association with identifiers of different tenants, workspaces, projects, tests, and test instances to which those transformed obfuscated data sets pertain.

In some embodiments, the view generator 30 may be configured to interrogate the data repository 28, in some cases responsive to requests for user interfaces received via one of the servers 22 or 24, and construct instructions to present requested user interfaces, such as dashboards, reports, query responses, and the like. These instructions may be sent to the requesting device or an intermediary device, or both of which may replace obfuscated identifiers with corresponding confidential data in the manner described below. In some embodiments, the view generator 30 may be configured to generate views of transformed data in which obfuscated data identifiers serve as placeholders within the views for confidential data that is accessed within the trusted computing environment 16 or 18 to which the data pertains, in some cases by replacing the obfuscated data identifiers with the corresponding confidential data, for example, as described in greater detail below with reference to FIGS. 4 and 5. In some embodiments, the view generator 30 may be configured to form instructions by which client computing devices are instructed to render webpages, for example, in web browsers, or in some cases the view generator 30 may be configured to generate instructions (which may include data that causes a display to be rendered) sent to a native application that forms a user interface. In some embodiments, the instructions may be or include markup language instructions, scripting language instructions, styling instructions, and data by which user interfaces are formed. Similar approaches may be applied to machine-to-machine communications, e.g., via API communications in which the requested data is not used to form a user interface.

In some embodiments, the trusted computing environment 16 may be associated with a tenant identified in a tenant account in the repository 28, in some cases associated with tenant credentials, roles and permissions of users having seats in the tenant account, and various workspaces, projects, tests, and test instances within those projects associated with the respective tenant.

In some embodiments, the trusted computing environment 16 may include an instance of the on-premises component of the performance-testing application 14. In some embodiments, each of the illustrated trusted computing environments 16 and 18 may include some or all of the components shown in the trusted computing environment 16, for example, different instances of the on-premises component of the performance-testing application 14. In some embodiments, the trusted computing environment 16 may include a firewall 32, a target application 34, a user computing device 36, and a private network 38, which may be a virtual private cloud in some cases.

In some embodiments, the on-premises component of the performance-testing application 14 may test the illustrated target application 34 by applying a load to various services and other resources exposed by the target application, for example, requesting content, engaging in scripted transactions, sending application program interface requests, querying records of the target application 34, and the like. Loads may be application-layer loads (e.g., with application-layer requests and responses), or some embodiments may apply loads at other layers of the stack. In some embodiments, the target application may be a component, such as a service (e.g., a micro-service) of a larger distributed application. In some cases, the target application 34 may be a user facing application, such as a website, a backend to a native application, or an API exposed to third party applications.

In some embodiments, the user computing device 36 may be one of a plurality of user computing devices within the trusted computing environment 16, some of which may be authorized to access confidential data within the trusted computing environment 16, such as a computing device of an operations engineer, developer, or system administrator.

The term "trusted" in "trusted computing environment" is used to distinguish a network of one or more computing devices in which access is limited or blocked for computing devices outside of the network. The term "trusted" does not require any particular state of mind with respect to trust. Rather the term distinguishes between different computing environments in which external access is limited, for example, by firewall 32. Various types of access controls may be applied, in some cases prohibiting data or certain types of data (e.g., in certain application-layer protocols) from leaving the computing environment, such as confidential data.

The term confidential data and "nonconfidential data" again are used to distinguish data permitted to leave the respective trusted computing environment from data that is not permitted to leave. For example, "nonconfidential data" need not be public data, or data suitable for sharing with other parties to constitute "nonconfidential data," as long as that date is permitted to leave a trusted computing environment, for example, for transmission to the SaaS component of the performance-testing application 12. Thus, in some cases, some of the data within a given trusted computing environment 16 may be confidential, and thus prohibited from leaving the trusted computing environment 16 (at least with respect to SaaS component 12), while other data may be nonconfidential and permitted to leave the respective trusted computing environment 16. Different ones of the illustrated trusted computing environment, 16 and 18 may have different data sets with different subsets that are confidential and nonconfidential.

The term "software-as-a-service" as used herein is not limited to a particular pricing model (e.g., SaaS architectures could be offered free arrangements or one-time-fee arrangements) and is used to refer generally to multi-tenant architectures in which at least some components of a distributed application are off-premises and shared among tenants. SaaS, thus, is used to refer to multi-tenant off-premises hosted services. A service is hosted "off-premises" if it is hosted outside of a trusted computing environment, and examples can include multi-tenant implementations and single-tenant implementations (e.g., where different off-premises instances are executed for different tenants, or only a single entity is served). Further, the term "on-premises" is not limited to computing devices in a brick-and-mortar facility owned by an entity for which the computing devices are treated as being "on-premises" and can include, for instance, trusted hosted computing resources, for example, in a virtual private cloud.

Data leaves a trusted computing environment when that data is accessible outside of the trusted computing environment. For example, data that is encrypted and sent with a key suitable to decrypt the data outside the trusted computing environment leaves that trusted computing environment, while data that is encrypted and sent outside of the trusted computing environment without ever sending that key outside of the trusted computing environment is not said to have left the trusted computing environment.

In some embodiments, some of the user interfaces presented on computing devices within the trusted computing environment may be presented on the user computing device 36, for example, responsive to user requests entered into user interfaces in a web browser executing within an operating system on that user computing device 36. Or in some cases, requests may be requests to APIs from programs executing on the user computing device 36, which in some cases may be another analytics application or reporting application within the trusted computing environment 16.

In some embodiments, the on-premises component of the performance-testing application 14 may include a data gateway 42, an orchestration manager 40, an on-premises data repository 44, and a plurality of load generators 46. In some embodiments, these components may cooperate to apply loads (e.g., simulating usage) to the target application 34 and measure performance of the target application 34 under load. Further, these components in some cases may obfuscate data sent from the on-premises component 14 to the SaaS component 12, in some cases replacing confidential data with obfuscated identifiers. On-premises component 14, in some cases, maintains records within the on-premises component 14 by which the replacement operation may be reversed in transformed data sent back to the on-premises component 14 or to the user computing device 36 from the SaaS component 12.

In some embodiments, the orchestration manager 40 is configured to elastically scale a number of load generators 46, instantiating load generators 46, configuring load generators 14, and spinning down load generators 46 as needed to apply loads to the target application 34. In some embodiments, the orchestration manager 40 implements the Taurus™ test automation framework, which may parse and implement tests configured in a human readable hierarchical data serialization format, like YAML, JSON, or XML. In some cases, various types of orchestration managers 40 may be used, including Docker Swarm™, Kuberenttes™, Apache Mesos™, and the like. In some embodiments, the orchestration manager 40 may be configured to create, coordinate among, and destroy containers, virtual machines, or other computing entities. In some embodiments, the orchestration manager 40 may be configured to access a repository of container or virtual machine images and a composition record specifying how to compose various containers or virtual machines and instruct a plurality of different computing devices to instantiate a plurality of instances of the load generators 46, in some cases with each load generator 46 corresponding to a different container executing in a different thread, and in some cases with a plurality of different containers executing within a container engine on a single computing device. Some embodiments may include a plurality of computing devices applying the load, in some cases over a test duration, which may be longer than 30 seconds, and in many cases longer than several minutes or longer than an hour or several hours. In some embodiments, the number of load generators 46 may be relatively large, for example, more than three, more than 20, more than 50, or more than 500, in some cases simulating load applied by more than 1000 users, for example, in commercially relevant use cases, more than 500,000 and in many cases more than 2 million users of the target application 34. In some embodiments, each container may execute within an isolated user space instance on a kernel of an operating system, with a given kernel in some cases executing a plurality of containers.

In some embodiments, the load generators may be configured to send request to the target application 34 specified by a test script stored within the on premises repository 44 and accessed by the orchestration manager 40 or the load generator 46 at the instruction of the orchestration manager 40. In some embodiments, the test scripts may specify requests to the target application, and in some cases a sequence of requests, and measurements to be performed on the target application 34, for example, response times for requests (e.g., time to first byte or time to completion), categorizations of errors, and criteria for evaluating responses. In some embodiments, the load generators 46 may execute JMeter™ test scripts, Selenium™ headless browsers routines, webdriver routines, and the like. Some embodiments may receive and render requested content, e.g. executing returned JavaScript™ to dynamically adjust a document object model and fully simulate client side state. In some cases, the scripts may include branching instructions that vary subsequent scripted load request responsive to results of earlier requests.

Examples of test loads include requesting a resource (like an image or data), requesting a webpage, querying a database, requesting a service from an API, and configuring state of a session, for example, in an online shopping application by adding items to a shopping cart, selecting flights, or configuring flights in an airline website, and the like. In some embodiments, measurements gathered by the load generators 46 may be stored in the on premises repository 44. Examples of measurements include labels for metrics, and values of those metrics, for example labels indicating particular resources, services, functions, or other components of the target application 34 accessed in a request in a load, and values associated with that label, like latency and a response time, an error code in the response, like hypertext transport protocol error codes (e.g., 404, 405, 406, or 408 errors), and values indicating whether various criteria applied to responses are satisfied, e.g., was a resource provided, time to last byte satisfying (e.g., being less than) a threshold, or time to first byte satisfying a threshold. In some embodiments, the labels may be confidential information indicating content of the target application 34, while the numerical values indicative of the metrics may be treated as nonconfidential information, for example, integer, Boolean, and real values that, without the label present, may be relatively uninformative to third party regarding the content and state of the target application 34.

In some embodiments, the data gateway 42 may be configured to access these records in the on-premises repository 44 and obfuscate the gathered data before sending the obfuscated data to the SaaS component 12. Examples of different techniques by which the data may be obfuscated are described in greater detail below with reference to operations in FIG. 2. In some embodiments, the data gateway 42 may further be configured to de-obfuscate data, such as transformed data received back from the SaaS component 12 within the on-premises component 14. In some embodiments, the obfuscation may include replacing obfuscated identifiers with corresponding confidential values reference by the obfuscated identifiers, or sending instructions to the user computing device 36 to perform this replacement. Again, examples of the obfuscation are described in greater detail below with reference to FIGS. 2 and 3.

In some embodiments, different functionality described herein may be executed within the trusting environment in the on-premises component 14 or in the SaaS component 12, outside the trusted computing environments 16 and 18, which is not to suggest that any other description is limiting. In some embodiments, the scripts that specify how to generate load, executed by the load generators 46, may reside in the on-premises repository 44 and, in some cases, may include confidential values. Or in some cases, the scripts may be stored in the SaaS repository 28, for example, in association with the tenant account, and a project and test associated with that tenant account. In some embodiments, the operation of the on-premises component may be directed by (e.g., with direction communication with) the user computing device 36, for example, upon a user configuring a test and instructing the on-premises component to perform the test, or the user computing device 36 may interact with the on-premises component 14 to request reports and user interfaces indicative of previous tests or by which tests are configured. In some embodiments, the on-premises component 14 may then request resources and services from the SaaS component 12 as needed, serving as an intermediary between the user computing device 36 and the SaaS component 12. Or in some embodiments, the operator of a user computing device 36 may interface with the SaaS component 12, and the SaaS component 12 may then direct the on-premises component 14 to implement functionality that is provided within the trusted computing environment, for example, sending instructions to the load generators 46 or sending instructions to de-obfuscate information. In some embodiments, the on-premises component 14 and the SaaS component 12 may coordinate via the user computing device 36, for example, a user interface sent by the SaaS component 12 may include instructions to retrieve resources from the on-premises component 14. Examples of these various scenarios are described in greater detail below with reference to FIGS. 2 through 5.

Figure 2:
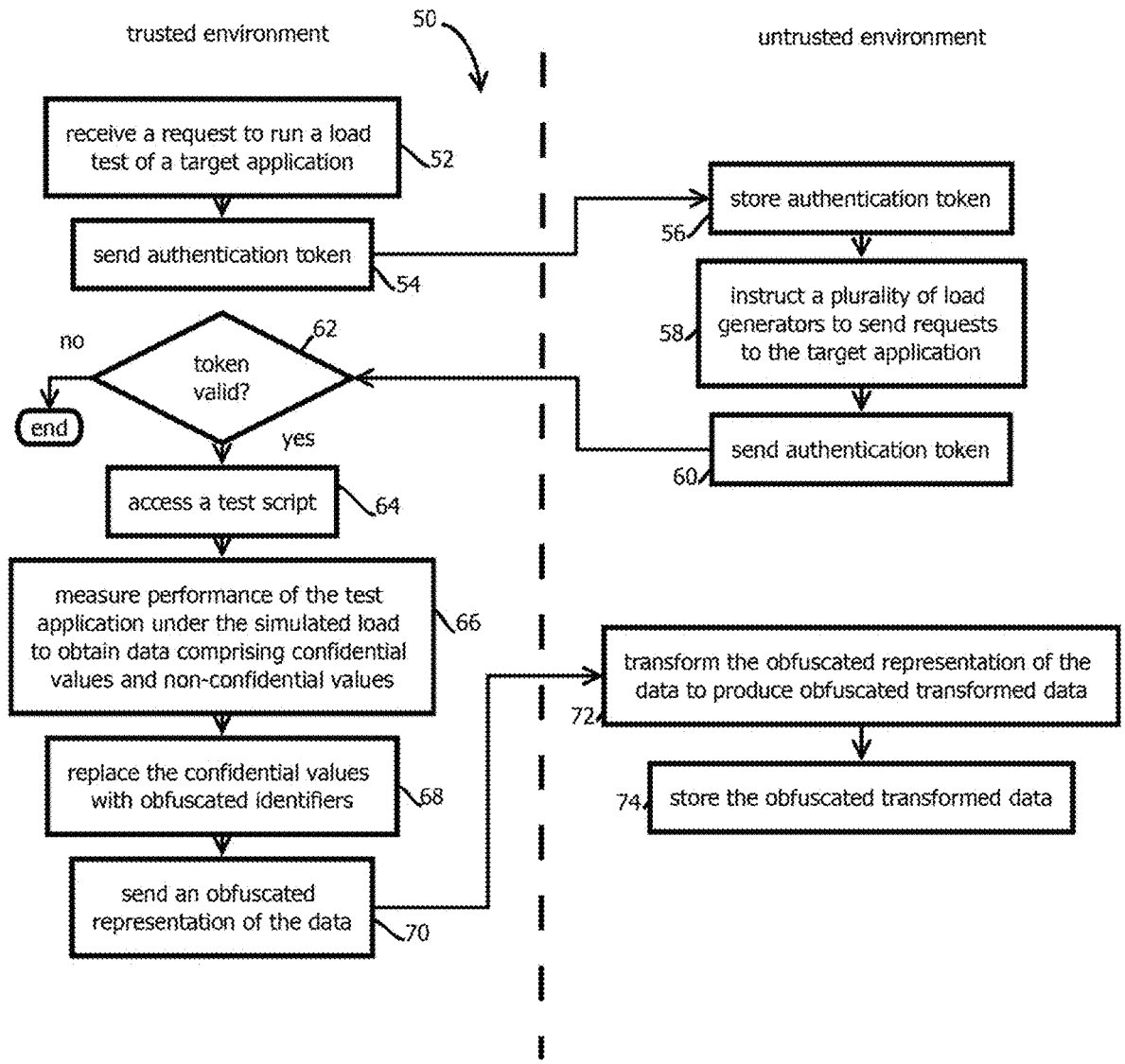
FIG. 2 is a flowchart that shows an example of a process to obfuscate confidential data within a trusted environment and transform the obfuscated data in an un-trusted environment in accordance with some embodiments of the present techniques.

FIG. 2 is a flowchart showing a process 50 by which a performance test may be implemented in a hybrid on-premises/SaaS performance-testing application. In some embodiments, the process 50 may be implemented in the computing environment 10 described above with reference to FIG. 1, but is not limited to the features of that embodiment, which is not to suggest that any other description is limiting. In some embodiments, the operations of FIG. 2, and the other processes and functionality described herein, may be executed in a different order from that described, may be replicated and executed concurrently, may have additional operations added, or some operations may be omitted, again which is not to suggest that any other description is limiting. Computer code by which the processes and functionality described herein are implemented may be stored on a tangible, non-transitory, machine-readable medium, such that when the computer code instructions are executed by one or more processors, the functionality described may be effectuated. Notwithstanding reference to the singular term "medium," the instructions may be stored on a plurality of different memories, in some cases on a plurality of different computing devices, with different subsets of the instructions stored on different computing devices, a configuration also consistent with use of the singular term "medium."

In some embodiments, the process 50 includes operations executed within a trusted environment and operations executed within an un-trusted environment, as indicated in FIG. 2. In some embodiments, the trusted environment may be one of the trusted environments 16 or 18 described above. In some embodiments, the untrusted environment may be any computing devices, data centers, networks, or the like outside of a trusted computing environment. As discussed, trusted computing environments are regions in which confidential values are accessible to at least some computing devices within the trusted computing environment. Thus, a trusted computing environment for one entity or computing device may be an un-trusted computing environment for other entities or other computing devices, and vice versa. The term "trusted" does not require any particular state of mind regarding trust and refers, in some embodiments, to regions in which access controls are implemented in the fashion described herein.

In some embodiments, the process 50 may begin after an on-premises component, like the component 14 described above, has been installed in a trusted computing environment, for example in a collection of rack-mounted computing devices, such as servers, within a private network behind a firewall, such as in a virtual private cloud. In some embodiments, the process 50 may be executed after a tenant account is configured in a SaaS component like that described above with reference to SaaS component 12, for example, adding data by which roles and permissions of users are indicated and enforced and one or more workspaces and one or more projects within those workspaces are created. In some embodiments, the process 50 may begin after a particular test has been configured, for example, by writing a test script or otherwise creating a test script, for example, by recording requests sent to a target application and generating the test script based on the recording. In some embodiments, the test script may be a JMeter™ test script, a Selenium™ test script, or the like.

Some embodiments of the process 50 may begin by receiving a request to run a load test of a target application, as indicated by block 52. In some embodiments, the request may be received at SaaS component 12 or on-premises component 14, for example, from user computing device 36 within trusted computing environment 16. In some embodiments, the user computing device may authenticate itself to a SaaS component by supplying credentials associated with a user account within a tenant account. Or in some cases the user computing device may authenticate itself to an on-premises component with similar communication. Some embodiments may compare the received credentials to stored credentials to determine whether to permit the requesting user, or in some cases a different process, such as one executing a scheduled test, to access the performance-testing application.

In some embodiments, after or in response to receiving the request or user logging in or process logging in, some embodiments may send an authentication token from the trusted computing environment to the un-trusted computing environment, as indicated by block 54. In some embodiments, the authentication token may be a string of randomly generated characters that are designed to be difficult to guess, in some cases sent in encrypted form, for example, encrypted with a public key of the SaaS component 12. The term "token" is not limited to a single sequence of characters delimited by white space and may include longer strings, for example, with multiple delimiters, such as a serialized hierarchical data format encoding of a data structure indicating aspects of a test to be run, such as an identifier of a project and tenant. In some embodiments, the sent authentication token may be received in the un-trusted computing environment, for example, by the SaaS component 12 described above. In some embodiments, the authentication token may be decrypted, for example, with a private key of the SaaS component, for example, according to an asymmetric encryption protocol, like Diffie Hellman, ElGamal, elliptic curve encryption techniques, RSA, or other public key encryption algorithms. Or, in some cases, the authentication token may be sent in unencrypted form with a relatively difficult to guess, relatively high entropy value, such as a randomly generated string having more than 256 characters, and the value may be sent via a secure channel, for example, via a virtual private network to which both the on-premises component and a SaaS component are connected.

In some embodiments, the received authentication token may be stored in the un-trusted environment, as indicated by block 56, for example, in association with a tenant account and a test or session with that tenant account. In some embodiments, a SaaS component may concurrently service a relatively large number of different tests in a relatively large number of different tenant accounts, and a relatively large number of different trusted computing environments, for example, more than 10, more than 50, or more than 1000, and some embodiments may use the session identifiers to distinguish between communications pertaining to these different tenants and tests, in some cases specifying the session identifiers within the SaaS component 12, for example, by incrementing a counter, sending the session identifiers back to a corresponding on-premises component to which the session identifier applies, and then including the session identifier in subsequent communications between the two on-premises and off-premises components.

Next, some embodiments may instruct a plurality of load generators to send requests to the target application, as indicated by block 58. As part of sending this instruction, for example in a communication prior, during, or after sending the instruction, some embodiments may send an authentication token associated with the instruction, as indicated by block 60, demonstrating that the computing device within the un-trusted computing environment sending the instruction has access to the sent authentication token from block 54. In some embodiments, this may include digitally signing the instruction with a digital signature that combines the sent instructions and the authentication token, for example, by XOR'ing a hash of the instruction with the authentication token. In some embodiments, the instructions may also be sent with a hash value produced by inputting the sent instructions into a hash function or other one-way function, such as an SHA 256 hash function. Some embodiments may re-create this hash calculation within the trusted computing environment and compare the sent hash value with the calculated hash value to determine whether the instructions have been modified in transit, as indicated by a difference in the hash values.

In some embodiments, the sent instruction may be received within the trusted computing environment. In some cases, sent instructions may be sent to the orchestration manager 40 described above, or sent instructions may be sent directly to load generators 46. In some cases, load generators 46 may be configured by the orchestration manager 40 to send requests to the SaaS component 12, and the SaaS component 12 may respond by sending the instructions to each of the requesting load generators 46 and coordinate the operation of the load generators 46. In some cases, this may include configuring some parameters of the load generators, instructing the load generators 46 when to send requests, instructing load generators 46 in how long to wait for responses to requests before classifying or scoring a performance of a given request, and configuring the load generators 46 regarding how to determine measurements based upon various responses to the request. In some cases, other aspects, or some of these aspects of a test, may be specified by a test script or other test configuration stored in the on-premises repository 44. Thus, in some cases, load generators 46 may be instantiated and at least partially configured by the orchestration manager 40 within the on-premises trusted computing environment 16, in some cases with test scripts residing within the trusted computing environment and applied to the load generators 46 by the orchestration manager 40, while some control over the operation of the load generators 46 may be executed exercised remotely by the SaaS component 12, in some cases through instructions authenticated with the sent authentication token.

In some embodiments, the load generators 46 may determine whether the authentication token is valid, as indicated by block 62. In some cases, this may include comparing an authentication token encrypted with a public key of the on-premises component 14 by the SaaS component 12, for example, decrypting the authentication token with a private key of the on-premises component 14. In some cases, the private key may be withheld from the load generators 46, and the load generators 46 may send a request to, for example, the orchestration manager 40 or other component, to validate received authentication tokens. Some embodiments may determine whether the decrypted authentication token matches or contains information that matches information in the sent authentication token, such as a randomly generated value longer than 256 bytes. Or some embodiments may determine whether the sent instructions were signed with a digital signature that demonstrates the computing device in the un-trusted environment has access to the sent authentication token from operation 54. In some embodiments, determining whether the authentication token is valid may include determining whether the authentication token has expired. In some embodiments, upon sending the authentication token, or upon creating an authentication token, some embodiments may store a timestamp or expiration time associated with the sent authentication token within the trusted computing environment, and some embodiments in operation 62 may access that record and determine whether the duration of time since the authentication token was created exceeds a threshold, or whether the expiration time has been exceeded at the current time. Upon determining that the authentication token has expired, some embodiments may decline to run the instructions and may send an error code back to the trusted computing environment, which may then attempt to renegotiate an exchange of an updated authentication token that may be applied to subsequent efforts to send instructions. In some embodiments, different tenants, different trusted computing environments of those tenants, different sessions of different users of those tenants, for example in different tests, may each have different authentication tokens, such that a user implementing one test may not interfere with that of another.

In some embodiments, upon determining the token is valid, some embodiments may execute the sent instructions, which may cause a load generator 46 to access a test script, as indicated by block 64, for example, a test script specified in the instructions or specified in a communication from the on-premises component orchestration manager 40, for example, when configuring and instantiating new containers in which respective load generators 46 execute.

Next, some embodiments may measure performance of the test application under a simulated load to obtain data including confidential values and nonconfidential values, as indicated by block 66. In some embodiments, this may include a plurality of different containers executing a plurality of different load generators 46, with each load generator 46 sending requests specified in the test script (e.g., concurrently), in some cases according to a timing specified by the instructions from the SaaS component 12, or in some cases according to timing specified by the on-premises component 14.

In some embodiments, test scripts or test configurations may specify that loads are to be applied over a specified duration of time by a specified number of load generators, or simulating a specified number of users. In some cases, timing of requests may be randomized, in some cases with probabilities of sending requests in a duration of time being modulated according to aggregate load amounts over different durations of time specified in a test configuration or test script. For example, some embodiments may gradually ramp up a test in a manner specified by a test configuration or test script associated with that test configuration to determine whether failure happens at something less than a maximum load specified by the test. In some cases, the tests may simulate more than 1 million or more than 2 million, and in some cases more than 10 million users accessing the target application, which may also be identified by a test configuration or the test script.

In some cases, test scripts may include instructions to request content at a uniform resource locator (URL), such as a hypertext transport protocol request at a designated URL. In some embodiments, the instructions in a test script may include instructions to post or otherwise input information into the test application, for example, configuring a user account, configuring a shopping cart, configuring travel arrangements, configuring a product, or the like, in some cases in a sequence of inputs specified by the test script (which may including simulating user selection of inputs in a user interface by, e.g., simulating clicks on icons or touches on icons), in some embodiments with conditional branching based upon responses to previous requests in a test script. In some embodiments, each request in a test script may be associated with one or more metrics associated with that request by which responses of the target application to the request are characterized, such as latency metrics, and metrics corresponding to various forms of failure, like 404 errors or 3xx errors, and the like. In some embodiments, a response may have a plurality of different resources sent back in the response, such as different images and other content within a webpage, and some embodiments may gather metrics on different ones of these resources, in some cases with a plurality of metrics for each of a plurality of different resources.

In some embodiments, the request is an application program interface requests, such as a query or request to a service in a micro services architecture, for example, simulating requests by one service to another service in a micro services architecture. Some embodiments may test various services in a micro services architecture during development of the architecture, such that developers do not need to wait for the entire distributed application in the micro services architecture to be built before different components can be tested. For example, some embodiments may be used to test a database before a front end or business logic is constructed for such an application, or vice versa. In some embodiments, each of the load generators may associate each request with the set of metrics gathered responsive to that request, in some cases associating each request with a timestamp or transaction identifier, such as a session identifier used by the target application. Some embodiments may associate these timestamps or session identifiers with timestamps or session identifiers gathered by other monitoring software used in the target application, such as server-log analysis applications or application performance management applications, which in some cases, may instrument various subroutines and other application components of the target application and provide relatively granular transaction pipelines indicating how long each subroutine or application component took in servicing a given request, such that problematic metrics gathered by the test application may be associated with individual application components or functions in the target application that are likely responsible for poor performance measured by the performance-testing application. Thus, some embodiments may assist users with the identify root causes of poor responses to test loads.

In some embodiments, gathered metrics may be stored in the on-premises repository 44 by each of the load generators 46, in some cases as a test load is applied, and in some cases in association with an identifier of an instance of a test, which may be one of a plurality of instances of a test, which may be one of a plurality of tests in a project, which may be one of a plurality of projects within a workspace, which may be one of a plurality of workspaces within a tenant account, which may be one of a plurality of tenant account serviced by the SaaS component 12.

In some embodiments, the on-premises component 14 may prepare the measurement results from the load test to be sent to an un-trusted computing environment, such as the SaaS component 12 described above, by replacing confidential values in the test data with obfuscated identifiers, as indicated by block 68. Replacement may take a variety of forms. Replacement does not require that an extent data structure be modified and may be performed by creating a new instance of that data structure in which the replaced values are omitted and the replacing values are applied in their place. In some embodiments, replacement may be performed concurrently with otherwise modifying that data structure, for example, transforming the data structure into a different format suitable for the SaaS component 12 or while aggregating information reported by the load generators 46, for example, calculating counts for histogram bins, calculating various statistics, like measures of central tendency (such as a mean, median, or mode), and calculating various measures of variation, such as standard deviations or variances.

Replacement may include identifying confidential values within the test data or reported by the load generators to the on premises repository 44. (Or in some cases, replacement may be performed by the load generators 46 to expedite operations by concurrently performing replacement.) In some embodiments, the test data gathered by the load generators may include both confidential values and non-confidential values. Which values are confidential may depend on the use case. In some embodiments, labels that are specific to the namespace of the target application 34 may be treated as confidential values by default. In some cases, labels in the test script, such as identifiers of resources and commands and other information in requests, may be classified as confidential by default. In some embodiments, numerical values indicative of amounts of time, amounts of errors, and Boolean values indicative of failure or success, and the like, may be, by default classified as nonconfidential values, as such information indicates performance, but does not indicate to what the performance measurement applies. In some embodiments, a test configuration or test script may be parsed to identify explicit designations of labels of metrics or values of metrics as confidential or nonconfidential. For example, users may compose test configurations or test scripts by including flags, such as Boolean values, indicating which components are confidential or nonconfidential.

Next, some embodiments may send the obfuscated representation of the data to the un-trusted computing environment, such as to the SaaS component 12, as indicated by block 70. In some embodiments, the confidential values do not leave the trusted environment and are not provided to the SaaS component 12, while the obfuscated identifiers and the nonconfidential values are provided to the SaaS component 12 in the un-trusted environment. In some embodiments, relationships between confidential values and nonconfidential values and between pairs of confidential values, may be maintained in the replacement operation of block 68 and discernable in the obfuscated data. For example, a label associated with a value indicative of a latency and requesting a resource identified by that label may be replaced by an obfuscated identifier that is also associated with that value indicative of latency in the obfuscated representation of the data.

Obfuscated identifiers may be determined with a variety of techniques configured to avoid namespace collisions and, in some cases, to avoid leaking information about the confidential values to malicious parties performing statistical analysis on obfuscated representations of the data. In some embodiments, a different namespace of obfuscated identifiers may be maintained for each test, and the obfuscated identifiers in test results for a given test may be identified in association with an identifier of that test, such that the corresponding namespace and mappings between confidential values and non- and identifiers may be accessed, and collisions between tests need not be processed. In some embodiments, obfuscated identifiers may be random values of a specified length, such as hexadecimal values 256 characters long. Some embodiments may, upon creating a new obfuscated identifier, access a data structure indicative of previously applied obfuscated identifiers within a given namespace, such as within a given set of test data and determine whether a newly created, such as a randomly created, obfuscated identifier has previously been applied and, upon determining that the value has previously been applied, those embodiments may then reject the obfuscated identifier and create a new obfuscated identifier, such as by requesting a new random value (for example a pseudorandom value, such as one created with a linear shift register seeded with a thermal measurement or radio-frequency noise measurement). For example, some embodiments may create a Bloom filter to determine whether pseudorandom obfuscated identifiers have been previously used and access the Boom filter to determine whether a new one can safely be applied.

Avoiding namespace collisions in obfuscated identifiers that are randomly generated may become difficult as the number of obfuscated identifiers increases, as there is an increasing number of values to compare a new obfuscated identifier against to determine whether a collision has happened. For larger data sets, some embodiments may determine obfuscated identifiers with other techniques. For example, some embodiments may determine obfuscated identifier by calculating a transformation of the confidential value with a one-way function, such as a cryptographic function, like a cryptographic hash. For example, some embodiments may calculate an SHA-256 or MD5 hash value by inputting a confidential value into the hash function and using an output of the hash function as the obfuscated identifier for that value.

To mitigate the risk of some forms of brute force attacks, some embodiments may salt the confidential value, for example by appending a randomly generated value of a specified length, such as 64 characters, to the confidential value. In some embodiments, the appended value, or a prepended value, may be separated from the confidential value by a delimiter, such as a reserved sequence of characters, or in some cases, whitespace may be added to confidential values, and the appended or prepended randomly generated value may be placed at a specified position and in a string, such as 512 characters in. Or in some cases, a prefix separated from the rest of the obfuscated string by a delimiter may include an index of ranges of positions within the obfuscated string corresponding to the confidential value, and embodiments may parse this prefix header to identify the range of values, and then access characters within that range of values to extract the confidential value. In the de-obfuscation operations described below, the confidential value may be parsed from a value produced by reversing these operations, for example, by identifying a delimiter, and splitting on the delimiter to identify the confidential value within a string. Or some embodiments may access a prefix or suffix with the threshold number of characters and then remove proceeding or trailing white space characters to re-create the confidential value. In some embodiments, confidential values may be retrieved in slightly different form, for example with proceeding or trailing white space characters omitted.

In some embodiments, each confidential value may be replaced with a different obfuscated identifier in a given set of test data. In some embodiments, within the on-premises repository 44, in association with the test, and in association with a given instance of that test corresponding to a test data set produced by load generators 46, some embodiments may create a data structure during the replacement operations that associates each confidential value with a corresponding obfuscated identifier with which it is replaced. For example, some embodiments may construct an index, such as a lookup table maintaining this association, which may be stored, for example, exclusively, in the on premises repository 44 of a given trusted computing environment.

In some embodiments, the lookup table may be structured for relatively fast retrieval of confidential values, for example, by sorting according to a key corresponding to the obfuscated identifier, or by using a threshold number of characters, or all, of the obfuscated identifier as an index into an array where the confidential value is stored in association with the full obfuscated identifier, with some values in the array storing potentially more than one set of pairs of obfuscated identifiers and confidential values in the event of collisions, for example, in a hash table. Or other content addressable data structures may be used, such as prefix trees or the like to facilitate relatively fast retrieval of confidential values given an obfuscated identifier.

Or some embodiments may use the following cryptographic techniques to avoid storing records that uniquely associate obfuscated identifiers with corresponding confidential values to which the obfuscated identifiers refer, which is not to suggest that any other description is limiting. This is expected to reduce the amount of memory consumed by the obfuscated representations of the data within the on-premises component. To this end, some embodiments may encrypt each confidential value in a separate encryption operation to produce a separate ciphertext for each confidential value, the ciphertext serving as an obfuscated identifier for that respective confidential value. In some embodiments, the encryption operation may be a symmetric key encryption process, for example, without both a public and a private key, or some embodiments may use public-key encryption. For example, some embodiments may obtain a random value for each test instance and corresponding set of test data (or subset thereof, in some cases with a given random value serving as a key for a plurality of different ciphertexts). Some embodiments may then combine the random value with the confidential value in a given encryption operation with an XOR operation (in some cases appending whitespace or other reserved characters or using a prefix or suffix of the random string to match length) to produce a ciphertext corresponding to an obfuscated identifier for that given confidential value.

In some embodiments, this approach may be relatively fast, but may be susceptible to some types of attacks, for example with rainbow tables or statistical attacks in which the same confidential value producing the same obfuscated identifier in different instances of that confidential value is leveraged to undermine the value of a one-way function, for example to reveal a key. In some embodiments, salt values may be applied, for example, another random value (specific to the cyphertext and not shared among different confidential values) may be prepended or appended to the confidential value (or noted in the header described above) before the cryptographic operation may be used to mitigate the risk of statistical attacks exploiting instances in which the same confidential value in different instances produces the same ciphertext.

In some cases, it may be desirable to mitigate the risk of statistical attacks while preserving in the obfuscated representation information by which different instances of the same confidential value can be matched to one another (in the obfuscated data), without revealing the content of that confidential value outside the trusted environment. Accordingly, some embodiments may group confidential values according to the content of those values, for example, one group may include three instances of a given confidential value that match, while another may include five, such as instances in which a given label is repeated throughout a measurement data set. Within each of those groups, some embodiments may determine a group identifier that does not reveal the confidential content (e.g., a random value). Some embodiments may include the group identifier for the confidential value in the obfuscated identifier, for example, appended or prepended to the obfuscated identifiers described above, for example, with a delimiter or at a specified number of character positions. Thus, outside the trusted environment, different obfuscated identifiers may be matched to one another by the group identifier, even though other portions of the obfuscated identifiers are different, when those different obfuscated identifiers correspond to the same confidential value content.

Next, some embodiments may send the obfuscated representation of the data to the SaaS component 12 in the un-trusted environment, as indicated by block 70. In some embodiments, the SaaS component 12 may store the obfuscated representation of the test data in association with an identifier of a test and an identifier of a test instance in a user account in a tenant account in the SaaS repository 28.

Some embodiments may transform the obfuscated representation of the data to produce obfuscated transformed data in the un-trusted environment, for example, with the SaaS component 12, as indicated by block 72. In some embodiments, the transformation may be performed by the above-described analytics module 26, which in some cases may include a distributed concurrent processing framework operative to perform operations concurrently on a plurality of different computing devices on relatively large data sets, for example, in MapReduce implementations, such as Hadoop™, Apache Spark™, Apache Storm™, and the like.

In some embodiments, the transformations may take a variety of different forms. In some embodiments, transforming the obfuscated representations of the data may include aggregating the data in aggregate measurements. Examples include calculating an average or other measure of central tendency, for example, for a response time, a percentage of requests resulting in errors of a particular type, or the like. Other examples include determining counts, such as a number of transactions before an error occurs of a particular type or a number of transactions between errors, or measures of central tendency of these counts. Other examples include determining measures of variation, such as standard deviations or variances of various instances of these statistics. In some embodiments, the transformations may include grouping measurement data, for example, according to group identifiers in obfuscated identifiers, or according to obfuscated identifier in cases where the same confidential value content produces the same obfuscated identifier. Some embodiments may further include subgrouping measurement data, for example calculating counts for bins in histograms, for example, in different increments within a larger range. Examples include determining a number of errors of a particular type per minute or per 15 minutes over a duration of the test instance.

In some embodiments, transforming the data further includes filtering, reorganizing, and augmenting the obfuscated transformed data, for example, filtering the transform data with various queries to form various reports, such as dashboards or graphs in those dashboards. Augmenting the data may include querying the above-describe application performance management applications to match timestamps or transaction identifiers between the two applications and then supplement performance measurement data with application performance management data, such as with links to reports on individual transactions indicating how long various application components or functions of the application took to service a given transaction.

Some embodiments may then store the obfuscated transformed data in the un-trusted environment, for example, in the SaaS repository 28, as indicated by block 74. In some embodiments, storing the data may include populating a relational database or noSQL database with the obfuscated transformed data within the SaaS component 12. In some embodiments, some or all of the transformed obfuscated data may be sent back to the on-premises component 14, for example, for storage in the on-premises repository 44 for relatively fast retrieval within the trusted computing environment.

Figure 3:
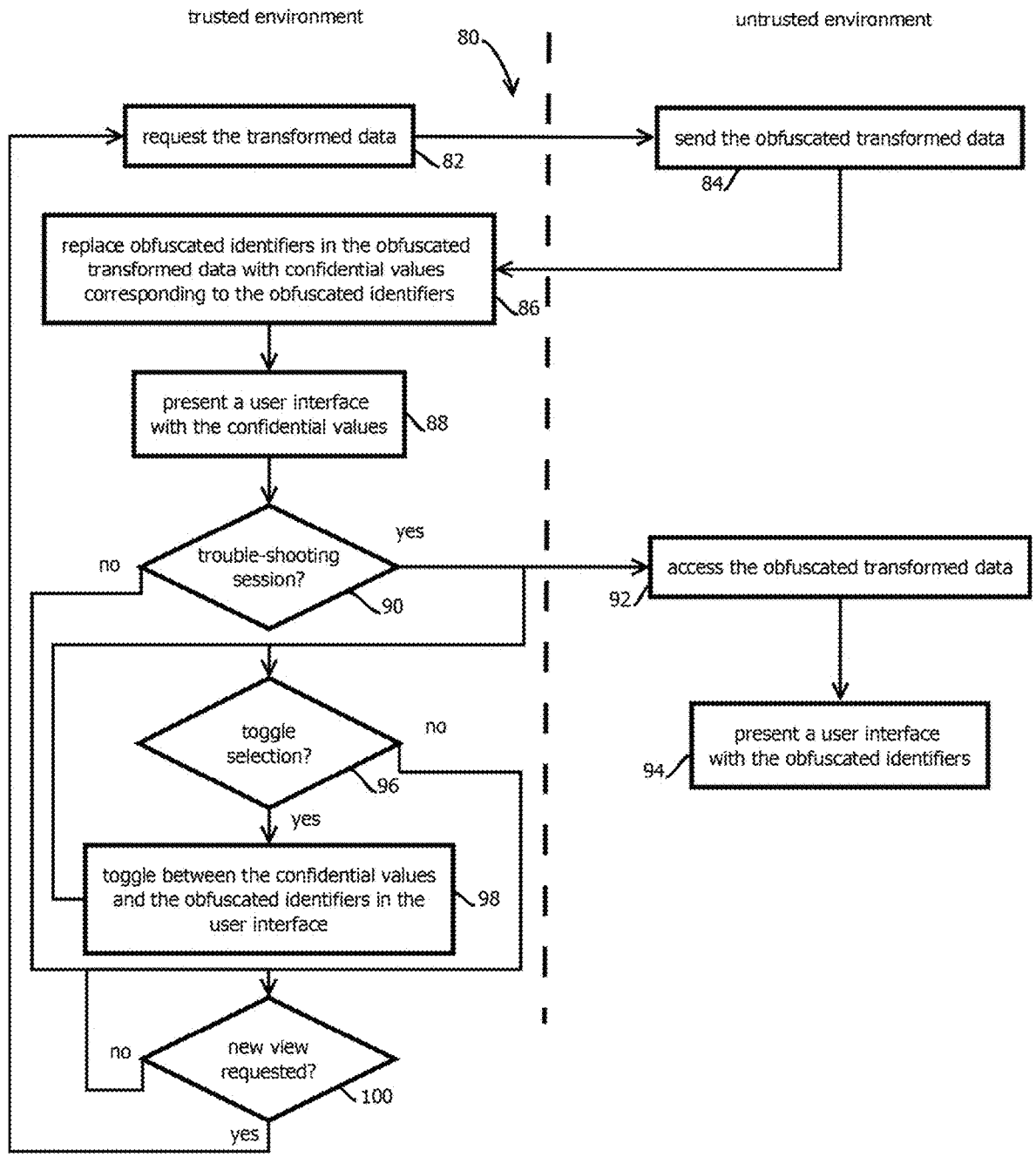
FIG. 3 is a flowchart that shows an example of a process to access the obfuscated data across the boundary between trusted and un-trusted computing environments in accordance with some embodiments of the present techniques.

FIG. 3 shows an example of a process 80 by which the obfuscated transformed data may be accessed and de-obfuscated within the trusted environment, in some cases only within the trusted environment, by coordinating between the trusted environment and the un-trusted environment. In some embodiments, the process 80 begins when a user wishes to view a report, individual metric, dashboard, or the like indicative of a load test like that described above. Or in some cases, the process 80 begins when another process, such as another service sends an API request for test results, for example, a query for test results.

In some embodiments, the process 80 may begin with requesting the transformed data in the trusted environment, as indicated by block 82. In some embodiments, the request may be sent to the un-trusted environment, for example, the SaaS component 12 above. In some embodiments, the SaaS component 12 may receive the request with the web server 22 or the API server 24, which may parse the request and construct a query based on their quest, which may be sent to a database management system of the SaaS repository 28. In some embodiments, the requested transformed data in obfuscated form may be retrieved from the SaaS repository 28, and the SaaS component 12 may send the obfuscated transformed data back into the trusted environment, as indicated by block 84. In some embodiments, this may occur immediately after a test is performed, or sometime afterwards, such as more than a minute, more than a day, or more than several weeks afterward, for example, during repeated viewings of the data by operations engineers analyzing a given instance of a test. In some embodiments, the sent obfuscated transformed data is a subset of that gathered in a given instance of a test, such as a subset pertaining to the request in block 82.

Next, some embodiments may replace, within the trusted environment, obfuscated identifiers in the obfuscated transformed data with confidential values corresponding to the obfuscated identifiers, as indicated by block 86. In some cases, this operation may be performed by the above-described data gateway 42. In some embodiments, replacement includes modifying an extant data structure including obfuscated identifiers by deleting and inserting new replacement confidential values corresponding to those obfuscated identifiers. Or in some embodiments, replacement includes creating a new representation of the data, in some cases a transformed representation of the data, such as a reformatted representation of the data in which obfuscated identifiers are not included and confidential values are included in their place, in some cases maintaining some or all of the internal associations between values in the obfuscated transformed data.

For each obfuscated identifier, a corresponding confidential value may be determined. In some embodiments, the obfuscated identifier may be parsed to remove the above-described group identifier, or group identifiers may not be included, or group identifiers may be used to narrow the universe of potential confidential values. In some embodiments, confidential values may be identified based on group identifier. In some embodiments, an obfuscated identifier (e.g., a value that uniquely identifies a confidential value without revealing the content of the confidential value outside the trusted environment) may be compared to each of plurality of keys in a lookup table, for example, with a binary search of an associative array pairing obfuscated identifiers with confidential values and that is sorted by obfuscated identifier. In some cases, an obfuscated identifier, or a prefix or suffix or segment thereof, may serve as an index of a value in a hash table array, and a value in the array corresponding to that position may be retrieved, which in some cases may include a plurality of keyvalue pairs with full expressions of obfuscated identifier serving as a key and full expressions a confidential values associated therewith serving his values. In this case, for example when collisions occur, some embodiments may retrieve the corresponding confidential value by matching the full obfuscated identifier to the keys. Or in some cases, the obfuscated identifier may be parsed and portions thereof may serve as indexes by which other content addressable data structures are traversed, such as prefix trees to identify confidential values corresponding to obfuscated identifiers relatively quickly. In some embodiments, an obfuscated identifier is a ciphertext, and some embodiments may decrypt the obfuscated identifier, for example, by retrieving a key from memory associated with the test instance and reversing the XOR operation above with the cryptographic key in a symmetric key encryption protocol. In some embodiments, decrypting a ciphertext obfuscated identifier may further include parsing the decrypted value to remove a salt value and extract the confidential value therein.

Next, some embodiments may present a user interface with the confidential values, as indicated by block 88, or embodiments may provide the requested data to the process submitting the API request in block 82. In some cases, presenting a user interface may include sending instructions to a user computing device executing a web browser that initiated the request for the transform data, the instructions causing the web browser to render a graphical user interface, like a dashboard or a table or graph in which the confidential values are depicted along with nonconfidential values responsive to the request. Sending instructions may include sending data and resources that cause the user interface to be rendered, along with scripting instructions, such as instructions that dynamically manipulate a document object model or virtual document object model within a web browser to form a graphical representation in a rendered webpage. Or in some cases, presenting the user interface may include sending data or other instructions that cause a native application to present such a user interface.

A variety of different architectures may be implemented to coordinate between a user computing device on which requested data is viewed (or a computing device executing a process making an application program interface request), the on-premises component 14, and the SaaS component 12. In some embodiments, all communication from the user computing device 36 that causes operations at the SaaS component 12 may be routed through the on-premises component and intermediated by the on-premises component 14, for example, with the on-premises component 14 performing certain operations responsive to a user request and sending request to the SaaS component 12 to perform other operations, with the SaaS component 12 sending responses back to the on-premises component 14 or to the user computing device 36. In some embodiments, all communication from the user computing device 36 that causes operations in the on-premises component 14 or the SaaS component 12 may be sent to the SaaS component 12, and then the SaaS component 12 may send requests and mediate interactions with the on-premises component 14, which may then send responses back to the SaaS component 12 or directly to the user computing device 36. In some use cases, the SaaS component 12 may coordinate with the on-premises component 14 via the user computing device 36, e.g., by sending instructions that cause the user computing device 36 to request resources from the on-premises component 14. Or some embodiments may implement various combinations of these arrangements, for example for different types of operations.

In some embodiments, users may need troubleshooting assistance by tech support outside the trusted computing environment. Providing tech support is often aided by both users sharing the same user interface, for example, with a shared screen, or by both navigating to the same user interface or program state in a native application and then discussing, for example, via email or phone call, concerns and troubleshooting issues. These interactions, however, are expected to be impaired where a tech support user interface outside the trusted environment does not display the information seen by a user within the trusted environment, making it difficult for the different users to communicate and troubleshoot problems.

To mitigate this issue and others, some embodiments may, in some cases, provide a user interface within the trusted computing environment by which a user in the trusted environment may view an un-trusted version of the same user interface to facilitate communications with those outside the trusted environment, such as tech support technicians. It should be emphasized, though, that a plurality of different problems are addressed, and not all embodiments address all problems, as the different embodiments are independently useful, which is not to suggest that any other description is limiting. For instance, this technique may be used independently of those above, and those above may be used independently of this technique.

Accordingly, in cases where there is a troubleshooting session ongoing, a different set of functionality may be invoked, as indicated by block 90. In some embodiments, a computing device outside the trusted environment may access the obfuscated transform data, as indicated by block 92. In some cases, this may include a tech support technician sending an application program interface request, such as a request for a user interface or database query indicated to be problematic by a user. Some embodiments may then present a user interface with the obfuscated identifiers in the obfuscated transformed data, as indicated by block 94. In some embodiments, this may be the same as a user interface viewed by a user within the trusted environment, or the same as a query result viewed by user within the trusted environment, except that confidential values are replaced with obfuscated identifiers corresponding to those confidential values in the version seen outside the trusted environment.

In some embodiments, a user within the trusted environment viewing a user interface may have an input by which they can toggle a selection between a trusted an un-trusted view version of the user interface, as indicated by block 96. In some embodiments, the user interface may include a user input, such as a button by which a user may request a change in a version of a given user interface between a trusted version showing confidential values and an un-trusted version showing obfuscated identifiers corresponding to those confidential values. In some embodiments, a region of a display screen, such as a region mapped to a button in the user interface, may be associated with an event handler corresponding to a particular type of user input, such as a onTouch event or an onClick event, or a user staring at a given region of space in a virtual reality presentation or augmented reality presentation for a threshold duration of time, a user pointing at a region of a space in such an implementation, or the like. In some embodiments, the event handlers may be responsive to a user selection of that region of the display upon subscribing to these events, and in some cases, the event handler may cause a script to be executed that accesses a obfuscated identifier corresponding to confidential values and modifies a document object model of a webpage in which the graphical user interface is displayed to replace the confidential value in the document object model with the obfuscated identifier, or vice versa depending upon a current state of the user interface at the time the toggle selection is received. In some embodiments, different event handlers may be mapped to different regions of a display screen of a user interface corresponding to individual values, and users may select and toggle individual values, rather than an entire display screen at once. Toggling values, in some cases, may include displaying both values, e.g., revealing the obfuscated identifier in a popup box adjacent a displayed confidential value.

Upon a user toggling a selection, some embodiments may toggle between the confidential values and the obfuscated identifiers in the user interface, as indicated by block 98, within the trusted environment, for example, on a web browser executing on the user computing device 36 described above.

In some embodiments, users may navigate between a plurality of different views of test data. Accordingly, some embodiments may determine whether a new view has been requested, as indicated by block 100. In some cases, regions of display screens having the user interfaces may be mapped to event handlers responsive to user input events that cause a determination to be made that a particular new view has been requested, and some embodiments may return to block 82 and request transformed data corresponding to that view.

In some embodiments, instructions to present user interface may be sent by the SaaS component 12 to a requesting user computing device 36 within a trusted computing environment. In some embodiments, those instructions may include instructions that cause the user computing device 36 to request confidential values corresponding to obfuscated identifiers from the data gateway 42. In some embodiments, such requests may be encoded as uniform resource identifiers or IP addresses within the trusted environment that cause a web browser rendering a user interface to send a request for content to the data gateway 42. In some embodiments, these instructions may further include a query string that identifies a test instance as a keyvalue pair in the query string and an obfuscated identifier corresponding to a given confidential value.

In some embodiments, the data gateway 42 is operative to receive these requests and determine the confidential value corresponding to a obfuscated identifier in a query string, and send back to the web browser the corresponding confidential value, which may be inserted into a document object model of a user interface by the user computing device, to present a version of the user interface with the confidential value. Thus in some cases, the SaaS component 12 may maintain in the SaaS repository 28 an IP address or URI of different data gateways in different computing trusted computing environments 16 or 18, and some embodiments may dynamically compose instructions to present user interfaces by accessing these records and inserting the appropriate URI or IP address for a given tenant from which a request is received into the sent instructions, thereby causing user computing devices 36 within the different trusted computing environment 16 and 18 to access the appropriate data gateway responsive to those computing devices.

Figure 4:
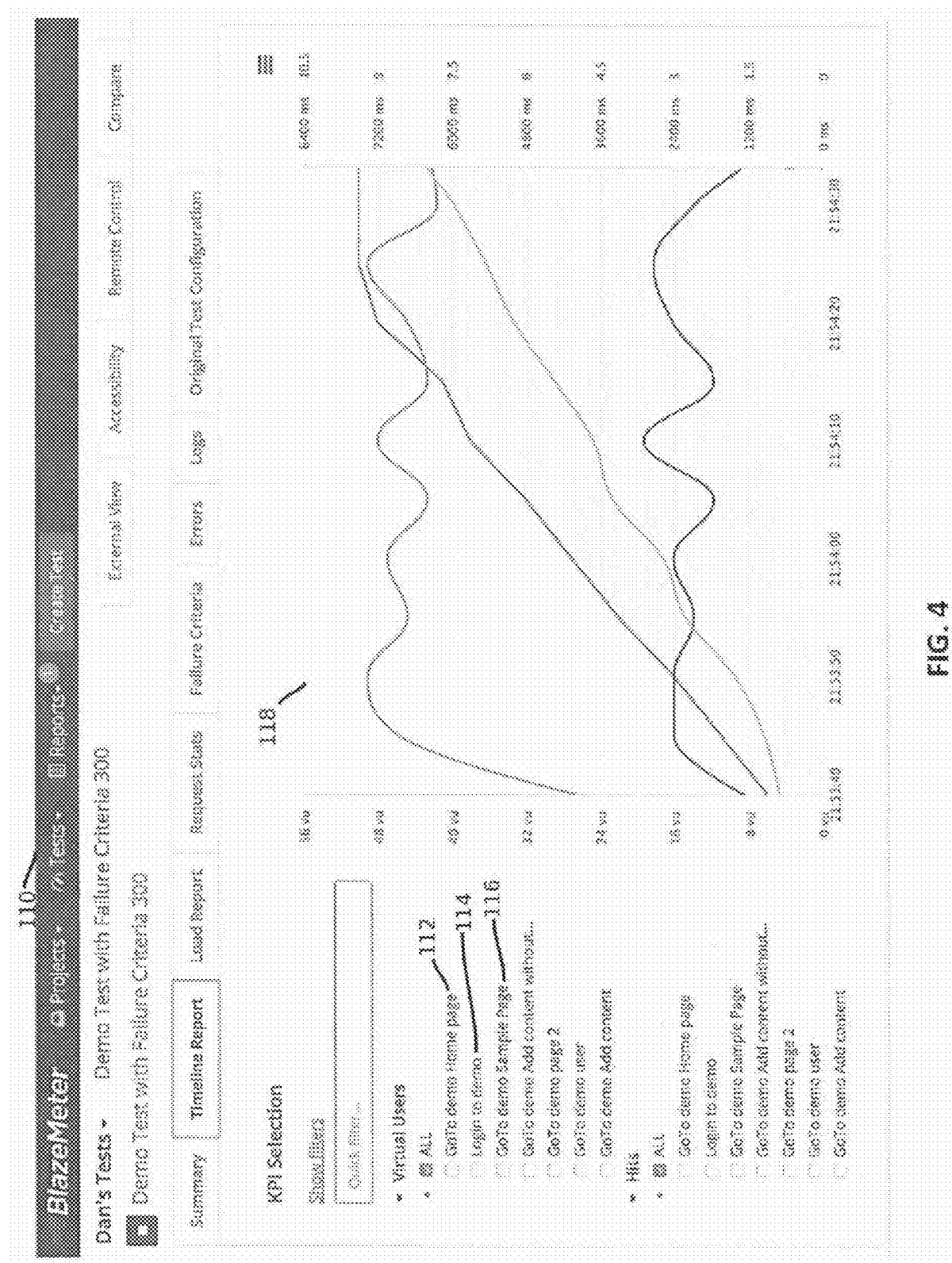
FIG. 4 is an example of a user interface displaying confidential data within a trusted computing environment in accordance with some embodiments of the present techniques.

FIG. 4 shows an example of a user interface 110 with confidential values displayed. In this example, the user interface 110 includes a plurality of confidential values 112, 114, and 116, and so on corresponding to labels that apply to various metrics that are represented numerically within a time series graph 118.

Figure 5:
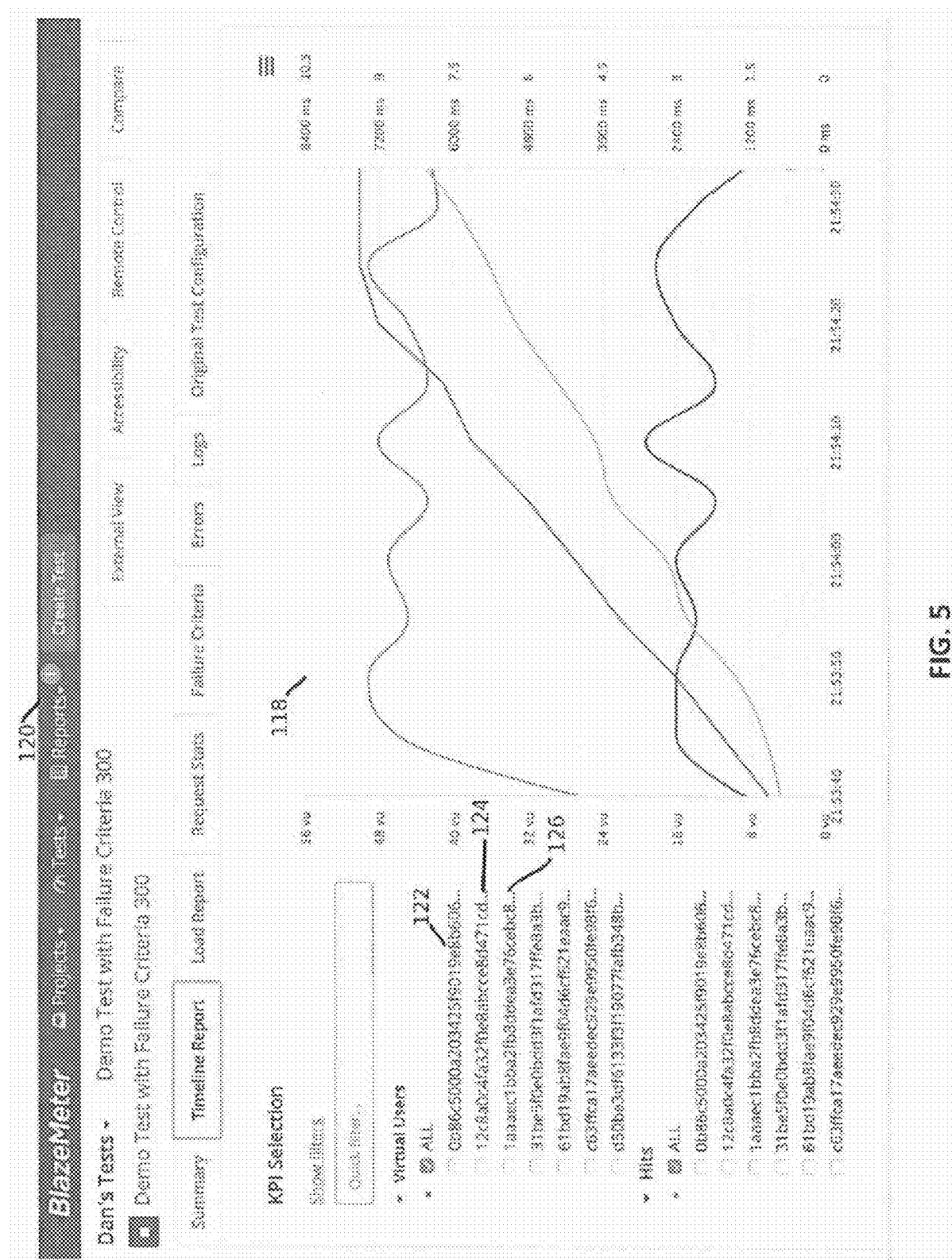
FIG. 5 is an example of a user interface displaying obfuscated identifiers of the confidential data in FIG. 4 for viewing outside the trusted computing environment in accordance with some embodiments of the present techniques.

FIG. 5 shows another version of that user interface, in user interface 120, in which obfuscated identifiers 122, 124, and 126, corresponding to confidential labels 112, 114, and 116 in FIG. 4, respectively, are presented. FIG. 5 shows an example of a user interface that may be viewable by a support technician outside a trusted computing environment. In some embodiments, a user inside the trusted computing environment may toggle between the views of FIG. 4 and FIG. 5 using the techniques described above.

Figure 6:
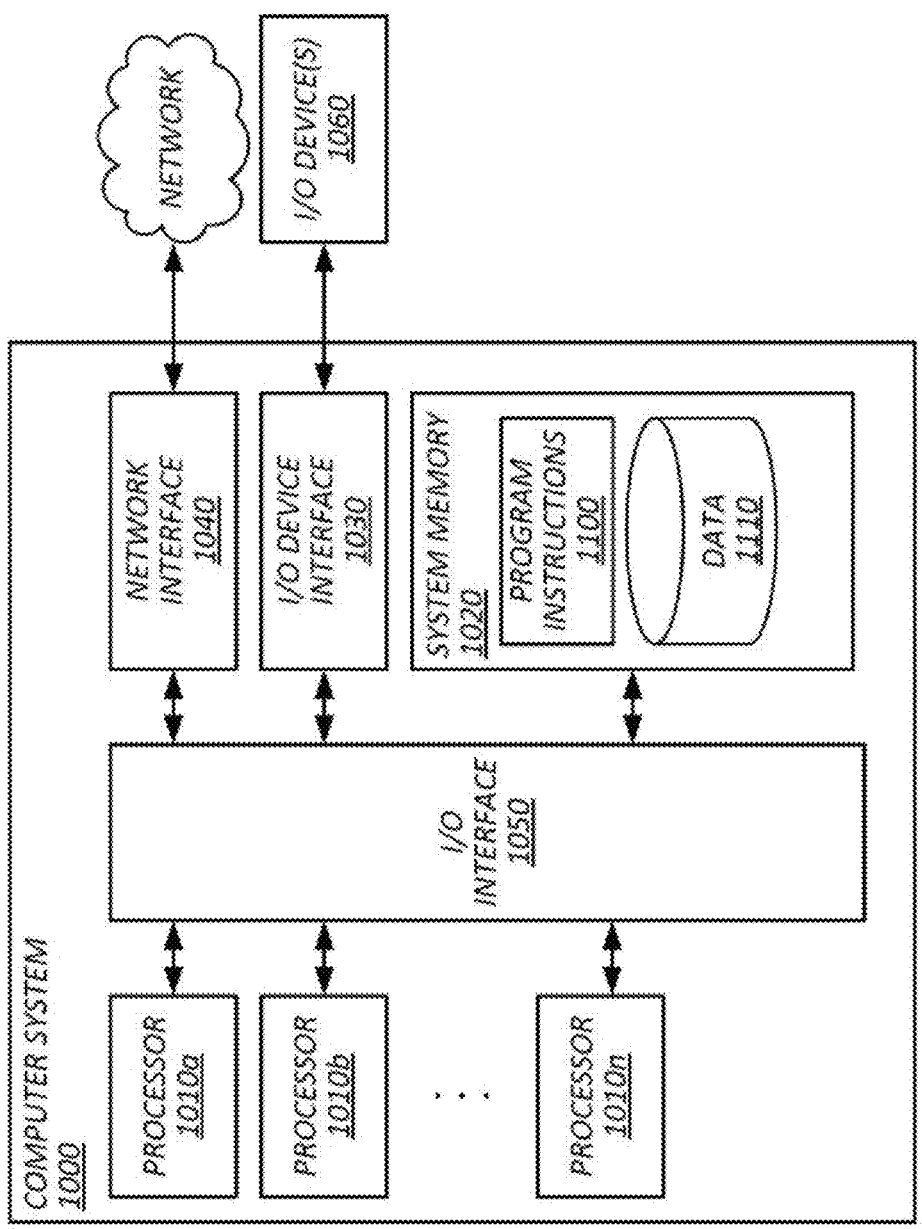
FIG. 6 shows an example of a computing device by which the present techniques may be implemented in some embodiments.

FIG. 6 is a diagram that illustrates an exemplary computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

In this patent, certain U.S. patents, U.S. patent applications, or other materials (e.g., articles) have been incorporated by reference. The text of such U.S. patents, U.S. patent applications, and other materials is, however, only incorporated by reference to the extent that no conflict exists between such material and the statements and drawings set forth herein. In the event of such conflict, the text of the present document governs.

The present techniques will be better understood with reference to the following enumerated embodiments:

1. A tangible, non-transitory, machine-readable medium storing instructions that when executed by one or more processors effectuate operations comprising: obtaining, with one or more processors, within a trusted computing environment, data comprising confidential values and non-confidential values, wherein the data comprises at least one hybrid association in which a first confidential value is paired with a first non-confidential value; replacing, with one or more processors, within the trusted computing environment, the confidential values with obfuscated identifiers to form an obfuscated representation of the data, wherein a first obfuscated identifier is paired with the first confidential value in the obfuscated representation of the data; sending, with one or more processors, from the trusted computing environment, into an untrusted computing environment, via a network, the obfuscated representation of the data; transforming, with one or more processors, in the untrusted computing environment, the obfuscated representation of the data to produce obfuscated transformed data including the obfuscated identifiers, wherein transforming includes determining results of an analysis based on the first non-confidential value, the results being included in the obfuscated transformed data; sending, with one or more processors, from the untrusted computing environment, via the network, the obfuscated transformed data into the trusted computing environment; and replacing, with one or more processors, within the trusted computing environment, obfuscated identifiers in the obfuscated transformed data with confidential values corresponding to the obfuscated identifiers in the obfuscated transformed data.

2. The medium of embodiment 1, the operations comprising: forming or modifying, within the trusted computing environment, a data structure in which confidential values are associated with obfuscated identifiers replacing the confidential values in the obfuscated representation of the data; wherein replacing obfuscated identifiers in the obfuscated transformed data with confidential values is based on the data structure in which confidential values are associated with obfuscated identifiers.

3. The medium of embodiment 1, wherein: replacing, within the trusted computing environment, the confidential values with obfuscated identifiers comprises forming at least some of the obfuscated identifiers by encrypting confidential data corresponding to respective obfuscated identifiers with an encryption key; replacing, within the trusted computing environment, obfuscated identifiers in the obfuscated transformed data with confidential values corresponding to the obfuscated identifiers in the obfuscated transformed data comprises decrypting the at least some of the obfuscated identifiers with the encryption key; and the encryption key is not provided to the untrusted computing environment.

4. The medium of embodiment 3, wherein: different encryption keys are used to form obfuscated identifiers by different entities sharing access to the untrusted computing environment.

5. The medium of embodiment 3, wherein: the encryption keys are symmetric encryption keys; and encrypting confidential data comprises appending or prepending a value that changes between encryption operations and a delimiter to the confidential data, the delimiter separating the value that changes between encryption operations from the confidential data.

6. The medium of any one of embodiments 1-5, wherein replacing, within the trusted computing environment, obfuscated identifiers in the obfuscated transformed data with confidential values corresponding to the obfuscated identifiers in the obfuscated transformed data comprises: replacing obfuscated identifiers in the obfuscated transformed data with confidential values with a first computing device within the trusted computing environment; and after replacing obfuscated identifiers in the obfuscated transformed data with confidential values, sending, from the first computing device within the trusted computing environment, to a second computing device within the trusted computing environment instructions to present a user interface in which at least some of the confidential values are presented to a user.

7. The medium of any one of embodiments 1-6, wherein replacing, within the trusted computing environment, obfuscated identifiers in the obfuscated transformed data with confidential values corresponding to the obfuscated identifiers in the obfuscated transformed data comprises: receiving, from a first computing device within the trusted computing environment, at a second computing device within the untrusted computing environment, a request for a user interface; sending, from the second computing device to the first computing device, instructions to present the user interface, the instructions including at least some obfuscated identifiers and instructions to request confidential data corresponding to the at least some obfuscated identifiers from a third computing device within the trusted computing environment; after sending at least some of the instructions, receiving, with the third computing device within the trusted computing environment, a request from the first computing device for confidential data corresponding to the at least some obfuscated identifiers; and sending, from the third computing device in the trusted computing environment to the first computing device in the trusted computing environment, the confidential data corresponding to the at least some obfuscated identifiers, such that the first computing device has the confidential data to replace obfuscated identifiers in the user interface instructions.

8. The medium of embodiment 7, the operations comprising forming the sent instructions with operations comprising: identifying a tenant identifier based on the tenant identifier being associated with the request for the user interface, wherein a plurality of tenants share the untrusted computing environment and are associated with different tenant identifiers; retrieving from memory, based on the tenant identifier, a uniform resource identifier (URI) or Internet Protocol (IP) address by which the third computing device is accessed within the trusted computing environment, wherein different tenant identifiers are associated in memory with different URIs or IP addresses; and including the retrieved URI or IP address in the sent instructions to request confidential data corresponding to the at least some obfuscated identifiers.

9. The medium of any one of embodiments 1-8, the operations comprising: receiving, with a data gateway within the trusted computing environment, from a requesting application, process, procedure, or function within the trusted computing environment, an application program interface (API) request; querying, with the data gateway, the obfuscated transformed data corresponding to the API request from the untrusted computing environment; receiving, with the data gateway, the obfuscated data, wherein replacing obfuscated identifiers in the obfuscated transformed data with confidential values corresponding to the obfuscated identifiers is performed by the data gateway; and providing, in response to the API request, de-obfuscated transformed data including the confidential values corresponding to the obfuscated identifiers in the obfuscated transformed data to the requesting application, process, procedure, or function.

10. The medium of any one of embodiments 1-9, the operations comprising: receiving, at a first computing device in the untrusted computing environment, from a second computing device in the untrusted computing environment, a request for a first version of a user interface including at least some of the obfuscated transformed data; providing, to the first computing device, with the second computing device, instructions to display the first instance of the user interface including the at least some of the obfuscated transformed data, the first version of the user interface not including confidential data corresponding to the at least some of the obfuscated transformed data.

11. The medium of embodiment 10, the operations comprising: providing to a third computing device within the trusted computing environment a second version of the user interface, the second version of the user interface including: a de-obfuscated version of the at least some of the obfuscated transformed data in which confidential values corresponding to the at least some of the obfuscated transformed data are presented; and an event hander subscribed to user interface events in which the first confidential value is selected by a user and configured to display, in response to a selection event, the first obfuscated identifier paired with the first confidential value.

12. The medium of embodiment 10, the operations comprising: providing to a third computing device within the trusted computing environment a second version of the user interface configured to display and visually associate the first confidential value with the first obfuscated identifier.

13. The medium of any one of embodiments 1-12, the operations comprising: receiving, with an on-premises portion of a hybrid on-premises/off-premises performance-testing application, a request to run a load test of a target application, wherein: the target application is executed at least partially within the trusted computing environment and stores at least some of the confidential data, the on-premises portion of the hybrid on-premises/off-premises performance-testing application is executed within the trusted computing environment, and a off-premises portion of the hybrid on-premises/off-premises performance-testing application is executed within the untrusted computing environment; accessing a test script with the on-premises portion of the hybrid on-premises/off-premises performance-testing application; instructing a plurality of load generators within the trusted computing environment to send requests to the target application specified, at least in part, by the test script to simulate a load on the target application; and measuring performance of the test application under the simulated load applied by the load generators, wherein the data comprising confidential values comprises values indicative of measured performance of the test application under the simulated load.

14. The medium of embodiment 13, wherein: transforming the obfuscated representation of the data, in the untrusted computing environment, to produce obfuscated transformed data is performed, at least in part, by the off-premises portion of the hybrid on-premises/off-premises performance-testing application; transforming the obfuscated representation of the data comprises determining metrics of a load test that aggregate measurements from a plurality of requests by the plurality of load generators to the target application.

15. The medium of any one of embodiments 13-14, comprising: obtaining an authentication token with the on-premises portion of the hybrid on-premises/off-premises performance-testing application; providing the authentication token to the off-premises portion of the hybrid on-premises/off-premises performance-testing application; providing the authentication token to the plurality of load generators; sending the authentication token and instructions from the off-premises portion of the hybrid on-premises/off-premises performance-testing application to a given one of the load generators; determining, with the given one of the load generators, that the authentication token from the on-premises portion corresponds to the authentication token sent by the off-premises portion; determining, with the given one of the load generators, that the authentication token has not expired; and in response to the determinations, executing the sent instructions with the given one of the load generators; wherein the authentication token includes a shared secret value or a digital signature corresponding to a public key of the on-premises portion of the hybrid on-premises/off-premises performance-testing application.

16. The medium of any one of embodiments 13-15, wherein: the load generators execute in containers orchestrated by the on-premises portion of the hybrid on-premises/off-premises performance-testing application; a plurality of the containers execute within a single kernel and each of the plurality of containers provide a respective isolated user space instances within the single kernel; the trusted computing environment includes a virtual private cloud, a private network separated from the untrusted computing environment by a firewall, or both; obfuscation comprises inputting a respective confidential value and a salt value that changes between obfuscation operations into a hash function configured to output a corresponding obfuscated value; the first obfuscated identifier identifies a resource of the target application to which at least some measurements of performance, including the first non-confidential value, pertain; a second obfuscated identifier is paired with a second confidential value in the obfuscated representation of the data; and the second obfuscated identifier identifies a component of the target application to which at least some measurements of performance pertain.

17. A method comprising: the operations of any one of embodiments 1-16.

18. A system, comprising: one or more processors; and memory storing instructions that when executed by the processors cause the processors to effectuate operations comprising: the operations of any one of embodiments 1-16.

What is claimed is:

1. A tangible, non-transitory, machine-readable medium storing instructions that when executed by one or more hardware processors effectuate operations comprising:

obtaining, with one or more hardware processors, within a trusted computing environment, data comprising confidential values and non-confidential values, wherein the data comprises at least one hybrid association in which a first confidential value is paired with a first non-confidential value;

replacing, with one or more hardware processors, within the trusted computing environment, the confidential values with obfuscated identifiers to form an obfuscated representation of the data, wherein a first obfuscated identifier is paired with the first confidential value in the obfuscated representation of the data;

sending, with one or more hardware processors, from the trusted computing environment, into an untrusted computing environment, via a network, the obfuscated representation of the data;

transforming, with one or more hardware processors, in the untrusted computing environment, the obfuscated representation of the data to produce obfuscated transformed data including the obfuscated identifiers, wherein transforming includes determining results of an analysis based on the first non-confidential value, the results being included in the obfuscated transformed data;

sending, with one or more hardware processors, from the untrusted computing environment, via the network, the obfuscated transformed data into the trusted computing environment;

replacing, with one or more hardware processors, within the trusted computing environment, obfuscated identifiers in the obfuscated transformed data with confidential values corresponding to the obfuscated identifiers in the obfuscated transformed data;

receiving, with an on-premises portion of a hybrid on-premises/off-premises performance-testing application, a request to run a load test of a target application, wherein:
the target application is executed at least partially within the trusted computing environment and stores at least some of the confidential data,
the on-premises portion of the hybrid on-premises/off-premises performance-testing application is executed within the trusted computing environment, and
a SaaS portion of the hybrid on-premises/off-premises performance-testing application is executed within the untrusted computing environment;

accessing a test script with the on-premises portion of the hybrid on-premises/off-premises performance-testing application;

instructing a plurality of load generators within the trusted computing environment to send requests to the target application specified, at least in part, by the test script to simulate a load on the target application; and measuring performance of the test application under the simulated load applied by the load generators, wherein the data comprising confidential values comprises values indicative of measured performance of the test application under the simulated load.

2. The medium of claim 1, the operations comprising:
forming or modifying, within the trusted computing environment, a data structure in which confidential values are associated with obfuscated identifiers replacing the confidential values in the obfuscated representation of the data;
wherein replacing obfuscated identifiers in the obfuscated transformed data with confidential values is based on the data structure in which confidential values are associated with obfuscated identifiers.

3. The medium of claim 1, wherein:
different keys are used to form obfuscated identifiers by different entities sharing access to the untrusted computing environment.

4. The medium of claim 1, the operations comprising:
appending or prepending a value that changes between obfuscation operations and a delimiter to the confidential data, the delimiter separating the value that changes between obfuscation operations from the confidential data.

5. The medium of claim 1, wherein replacing, within the trusted computing environment, obfuscated identifiers in the obfuscated transformed data with confidential values corresponding to the obfuscated identifiers in the obfuscated transformed data comprises:
replacing obfuscated identifiers in the obfuscated transformed data with confidential values with a first computing device within the trusted computing environment; and
after replacing obfuscated identifiers in the obfuscated transformed data with confidential values, sending, from the first computing device within the trusted computing environment, to a second computing device within the trusted computing environment instructions to present a user interface in which at least some of the confidential values are presented to a user.

6. The medium of claim 1, wherein replacing, within the trusted computing environment, obfuscated identifiers in the obfuscated transformed data with confidential values corresponding to the obfuscated identifiers in the obfuscated transformed data comprises:
receiving, from a first computing device within the trusted computing environment, at a second computing device within the untrusted computing environment, a request for a user interface;
sending, from the second computing device to the first computing device, instructions to present the user interface, the instructions including at least some obfuscated identifiers and instructions to request confidential data corresponding to the at least some obfuscated identifiers from a third computing device within the trusted computing environment;
after sending at least some of the instructions, receiving, with the third computing device within the trusted computing environment, a request from the first computing device for confidential data corresponding to the at least some obfuscated identifiers; and
sending, from the third computing device in the trusted computing environment to the first computing device in the trusted computing environment, the confidential data corresponding to the at least some obfuscated identifiers, such that the first computing device has the confidential data to replace obfuscated identifiers in the user interface instructions.

7. The medium of claim 6, the operations comprising forming the sent instructions with operations comprising:
identifying a tenant identifier based on the tenant identifier being associated with the request for the user interface, wherein a plurality of tenants share the untrusted computing environment and are associated with different tenant identifiers;
retrieving from memory, based on the tenant identifier, a uniform resource identifier (URI) or Internet Protocol (IP) address by which the third computing device is accessed within the trusted computing environment, wherein different tenant identifiers are associated in memory with different URIs or IP addresses; and
including the retrieved URI or IP address in the sent instructions to request confidential data corresponding to the at least some obfuscated identifiers.

8. The medium of claim 1, the operations comprising:
receiving, at a first computing device in the untrusted computing environment, from a second computing device in the untrusted computing environment, a request for a first version of a user interface including at least some of the obfuscated transformed data; and providing, to the first computing device, with the second computing device, instructions to display the first instance of the user interface including the at least some of the obfuscated transformed data, the first version of the user interface not including confidential data corresponding to the at least some of the obfuscated transformed data.

9. The medium of claim 8, the operations comprising: providing to a third computing device within the trusted computing environment a second version of the user interface, the second version of the user interface including:
a de-obfuscated version of the at least some of the obfuscated transformed data in which confidential values corresponding to the at least some of the obfuscated transformed data are presented; and
an event hander subscribed to user interface events in which the first confidential value is selected by a user and configured to display, in response to a selection event, the first obfuscated identifier paired with the first confidential value.

10. The medium of claim 8, the operations comprising: providing to a third computing device within the trusted computing environment a second version of the user interface configured to display and visually associate the first confidential value with the first obfuscated identifier.

11. The medium of claim 1, wherein:
transforming the obfuscated representation of the data, in the untrusted computing environment, to produce obfuscated transformed data is performed, at least in part, by the off premises portion of the hybrid on-premises/off-premises performance-testing application;
transforming the obfuscated representation of the data comprises determining metrics of a load test that aggregate measurements from a plurality of requests by the plurality of load generators to the target application.

12. The medium of claim 1, comprising:
obtaining an authentication token with the on-premises portion of the hybrid on-premises/off-premises performance-testing application;
providing the authentication token to the off-premises portion of the hybrid on-premises/off-premises performance-testing application;
providing the authentication token to the plurality of load generators;
sending the authentication token and instructions from the off-premises portion of the hybrid on-premises/off-premises performance-testing application to a given one of the load generators;
determining, with the given one of the load generators, that the authentication token from the on-premises portion corresponds to the authentication token sent by the off-premises portion;
determining, with the given one of the load generators, that the authentication token has not expired; and
in response to the determinations, executing the sent instructions with the given one of the load generators;
wherein the authentication token includes a shared secret value or a digital signature corresponding to a public key of the on-premises portion of the hybrid on-premises/off-premises performance-testing application.

13. The medium of claim 1, wherein:
the load generators execute in containers orchestrated by the on-premises portion of the hybrid on-premises/off-premises performance-testing application;
a plurality of the containers execute within a single kernel and each of the plurality of containers provide a respective isolated user space instances within the single kernel;
the trusted computing environment includes a virtual private cloud, a private network separated from the untrusted computing environment by a firewall, or both;
obfuscation comprises inputting a respective confidential value and a salt value that changes between obfuscation operations into a hash function configured to output a corresponding obfuscated value;
the first obfuscated identifier identifies a resource of the target application to which at least some measurements of performance, including the first non-confidential value, pertain;
a second obfuscated identifier is paired with a second confidential value in the obfuscated representation of the data; and
the second obfuscated identifier identifies a component of the target application to which at least some measurements of performance pertain.

14. The medium of claim 1, wherein:
replacing, within the trusted computing environment, the confidential values with obfuscated identifiers comprises forming at least some of the obfuscated identifiers by obfuscating confidential data corresponding to respective obfuscated identifiers with a key;
replacing, within the trusted computing environment, obfuscated identifiers in the obfuscated transformed data with confidential values corresponding to the obfuscated identifiers in the obfuscated transformed data comprises de-obfuscating the at least some of the obfuscated identifiers with the key; and
the key is not provided to the untrusted computing environment.

15. A method, comprising:
obtaining, with one or more hardware processors, within a trusted computing environment, data comprising confidential values and non-confidential values, wherein the data comprises at least one hybrid association in which a first confidential value is paired with a first non-confidential value;
replacing, with one or more hardware processors, within the trusted computing environment, the confidential values with obfuscated identifiers to form an obfuscated representation of the data, wherein a first obfuscated identifier is paired with the first confidential value in the obfuscated representation of the data;
sending, with one or more hardware processors, from the trusted computing environment, into an untrusted computing environment, via a network, the obfuscated representation of the data;
transforming, with one or more hardware processors, in the untrusted computing environment, the obfuscated representation of the data to produce obfuscated transformed data including the obfuscated identifiers, wherein transforming includes determining results of an analysis based on the first non-confidential value, the results being included in the obfuscated transformed data;
sending, with one or more hardware processors, from the untrusted computing environment, via the network, the obfuscated transformed data into the trusted computing environment; and
replacing, with one or more hardware processors, within the trusted computing environment, obfuscated identifiers in the obfuscated transformed data with confidential values corresponding to the obfuscated identifiers in the obfuscated transformed data, wherein:

replacing, within the trusted computing environment, the confidential values with obfuscated identifiers comprises forming at least some of the obfuscated identifiers by obfuscating confidential data corresponding to respective obfuscated identifiers with a key;

replacing, within the trusted computing environment, obfuscated identifiers in the obfuscated transformed data with confidential values corresponding to the obfuscated identifiers in the obfuscated transformed data comprises de-obfuscating the at least some of the obfuscated identifiers with the key;

the key is not provided to the untrusted computing environment;

receiving, with an on-premises portion of a hybrid on-premises/off-premises performance-testing application, a request to run a load test of a target application, wherein:
- the target application is executed at least partially within the trusted computing environment and stores at least some of the confidential data,
- the on-premises portion of the hybrid on-premises/SaaS performance-testing application is executed within the trusted computing environment, and
- a SaaS portion of the hybrid on-premises/SaaS performance-testing application is executed within the untrusted computing environment;

accessing a test script with the on-premises portion of the hybrid on-premises/SaaS performance-testing application;

instructing a plurality of load generators within the trusted computing environment to send requests to the target application specified, at least in part, by the test script to simulate a load on the target application; and measuring performance of the test application under the simulated load applied by the load generators, wherein the data comprising confidential values comprises values indicative of measured performance of the test application under the simulated load.

16. The method of claim 15, comprising:

forming or modifying, within the trusted computing environment, a data structure in which confidential values are associated with obfuscated identifiers replacing the confidential values in the obfuscated representation of the data;

wherein replacing obfuscated identifiers in the obfuscated transformed data with confidential values is based on the data structure in which confidential values are associated with obfuscated identifiers.

17. The method of claim 15, wherein:

different keys are used to form obfuscated identifiers by different entities sharing access to the untrusted computing environment.

18. The method of claim 15, comprising:

receiving, at a first computing device in the untrusted computing environment, from a second computing device in the untrusted computing environment, a request for a first version of a user interface including at least some of the obfuscated transformed data; and providing, to the first computing device, with the second computing device, instructions to display the first instance of the user interface including the at least some of the obfuscated transformed data, the first version of the user interface not including confidential data corresponding to the at least some of the obfuscated transformed data.

19. The method of claim 15, wherein:

replacing, within the trusted computing environment, the confidential values with obfuscated identifiers comprises forming at least some of the obfuscated identifiers by obfuscating confidential data corresponding to respective obfuscated identifiers with a key;

replacing, within the trusted computing environment, obfuscated identifiers in the obfuscated transformed data with confidential values corresponding to the obfuscated identifiers in the obfuscated transformed data comprises de-obfuscating the at least some of the obfuscated identifiers with the key; and the key is not provided to the untrusted computing environment.

* * * * *